(12) United States Patent
Mun et al.

(10) Patent No.: US 12,196,915 B2
(45) Date of Patent: Jan. 14, 2025

(54) META LENS ASSEMBLY AND ELECTRONIC DEVICE INCLUDING THE SAME

(71) Applicant: SAMSUNG ELECTRONICS CO., LTD., Suwon-si (KR)

(72) Inventors: Sangeun Mun, Seoul (KR); Seunghoon Han, Seoul (KR); Seaum Kim, Seoul (KR); Hyunsung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/184,382

(22) Filed: Mar. 15, 2023

(65) Prior Publication Data

US 2023/0228912 A1 Jul. 20, 2023

Related U.S. Application Data

(63) Continuation of application No. 17/404,168, filed on Aug. 17, 2021, now Pat. No. 11,630,238.

(Continued)

(30) Foreign Application Priority Data

Apr. 26, 2021 (KR) .................. 10-2021-0053757

(51) Int. Cl.
*G02B 1/00* (2006.01)
*G02B 13/00* (2006.01)
(Continued)

(52) U.S. Cl.
CPC ......... *G02B 1/002* (2013.01); *G02B 13/0015* (2013.01); *H04N 23/55* (2023.01);
(Continued)

(58) Field of Classification Search
CPC .... G02B 1/002; G02B 13/0015; G02B 13/02; G02B 2207/101; G02B 2003/0093;
(Continued)

(56) References Cited

U.S. PATENT DOCUMENTS

| 10,942,333 B2 | 3/2021 | Han et al. |
| 2010/0214456 A1* | 8/2010 | Tokuda .............. G02B 27/4277 348/335 |

(Continued)

FOREIGN PATENT DOCUMENTS

| EP | 3279704 A1 * | 2/2018 | ............. B82Y 30/00 |
| KR | 10-2016-0125875 A | 11/2016 | |

(Continued)

OTHER PUBLICATIONS

Shrestha, S., et al., "Multi-Element Meta-lens Systems for Imaging", 2019 Conference on Lasers and Electro-Optics, May 5, 2019, XP033570586, pp. 1-2.

(Continued)

*Primary Examiner* — Abdelaaziz Tissire
(74) *Attorney, Agent, or Firm* — Sughrue Mion, PLLC

(57) ABSTRACT

A meta lens assembly includes a first meta lens, a second meta lens arranged on an image side of the first meta lens, and a third meta lens arranged on an image side of the second meta lens, the first meta lens, the second meta lens, and the third meta lens being arranged from an object side of the meta lens assembly to an image side of the meta lens assembly facing an image sensor.

17 Claims, 25 Drawing Sheets

Related U.S. Application Data

(60) Provisional application No. 63/077,151, filed on Sep. 11, 2020.

(51) Int. Cl.
  *G02B 13/02* (2006.01)
  *H04N 23/55* (2023.01)
  *H04N 23/698* (2023.01)
  *H04N 23/80* (2023.01)

(52) U.S. Cl.
  CPC ........ *G02B 13/02* (2013.01); *G02B 2207/101* (2013.01); *H04N 23/698* (2023.01); *H04N 23/80* (2023.01)

(58) Field of Classification Search
  CPC .... G02B 3/00; G02B 5/1871; G02B 13/0085; G02B 13/006; G02B 13/06; H04N 23/55; H04N 23/698; H04N 23/80; H04N 23/57; H04N 25/611; H04N 13/229; H04N 13/232; H01L 27/14627; H01L 27/14625; H01L 27/14685; H01L 27/14632; H01L 27/14605; H01L 27/14618; H01L 33/58; H01L 27/156; H01L 31/0232; H01L 2933/0058
  See application file for complete search history.

(56) References Cited

U.S. PATENT DOCUMENTS

| | | | |
|---|---|---|---|
| 2014/0103478 A1 | 4/2014 | Usuda et al. | |
| 2015/0130973 A1* | 5/2015 | Saito | G02B 13/003 |
| | | | 359/356 |
| 2016/0299337 A1* | 10/2016 | Arbabi | G02B 5/0294 |
| 2016/0306079 A1 | 10/2016 | Arbabi et al. | |
| 2016/0316180 A1* | 10/2016 | Han | G02B 13/0055 |
| 2017/0146806 A1 | 5/2017 | Lin et al. | |
| 2018/0081150 A1* | 3/2018 | Nam | G02B 7/10 |
| 2019/0154877 A1 | 5/2019 | Capasso et al. | |
| 2020/0096672 A1* | 3/2020 | Yu | G02B 1/02 |
| 2020/0174163 A1 | 6/2020 | Han et al. | |
| 2020/0249429 A1 | 8/2020 | Han et al. | |
| 2020/0264343 A1 | 8/2020 | Han et al. | |
| 2021/0028215 A1* | 1/2021 | Devlin | G02B 27/0988 |
| 2021/0149082 A1* | 5/2021 | Chen | G02B 6/34 |
| 2021/0307608 A1* | 10/2021 | Hu | A61B 3/12 |
| 2023/0012003 A1* | 1/2023 | Ma | H01L 27/14627 |
| 2023/0194760 A1* | 6/2023 | Hao | G02B 1/002 |
| | | | 359/642 |

FOREIGN PATENT DOCUMENTS

| | | | |
|---|---|---|---|
| KR | 10-2020-0067074 A | 6/2020 | |
| KR | 10-2020-0099832 A | 8/2020 | |
| WO | 2017/176921 A1 | 10/2017 | |
| WO | 2018/218063 A1 | 11/2018 | |
| WO | WO-2018204856 A1 * | 11/2018 | ............. G02B 1/002 |

OTHER PUBLICATIONS

Communication dated Jan. 26, 2022 issued by the European Patent Office in application No. 21190610.2.

* cited by examiner

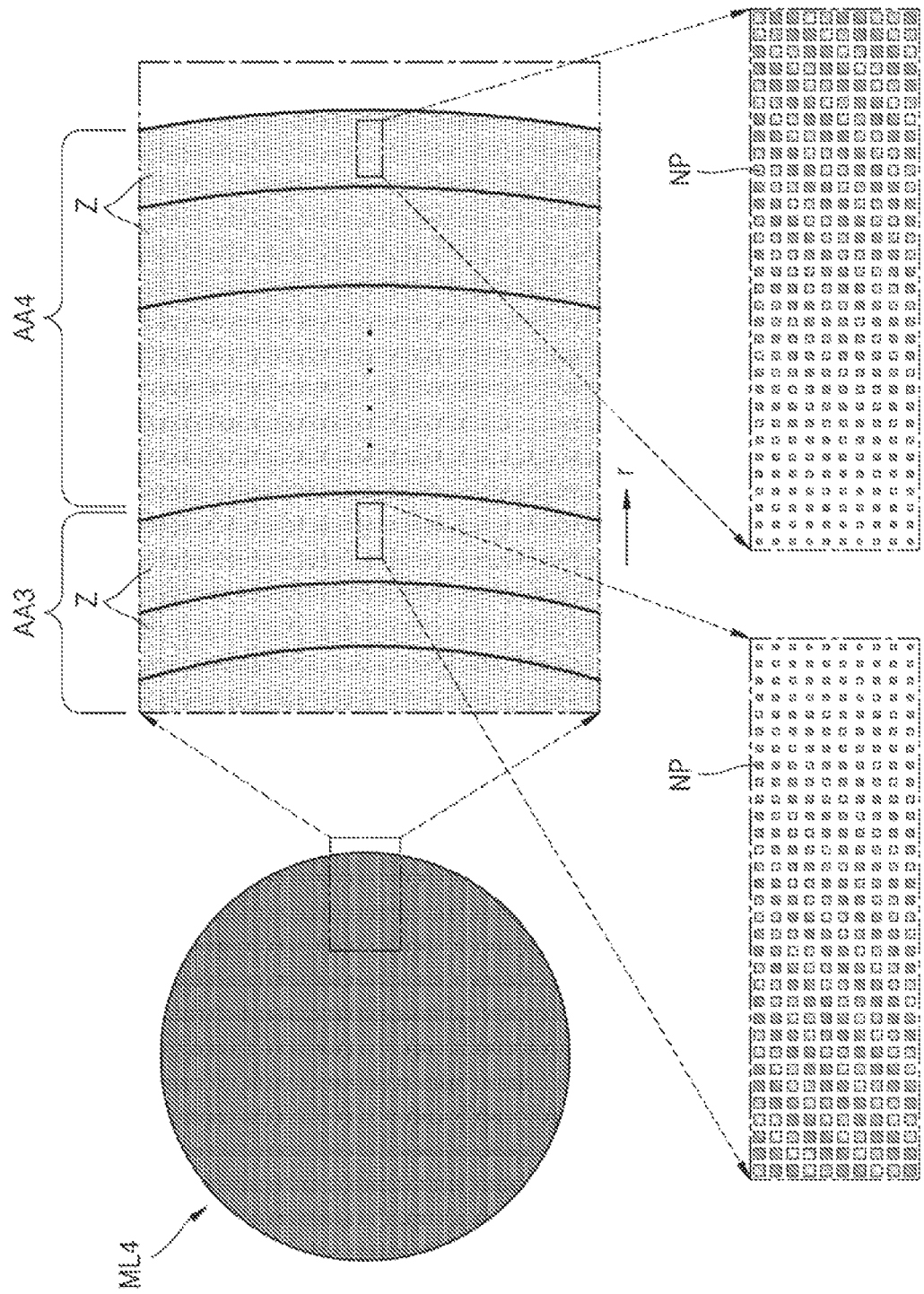

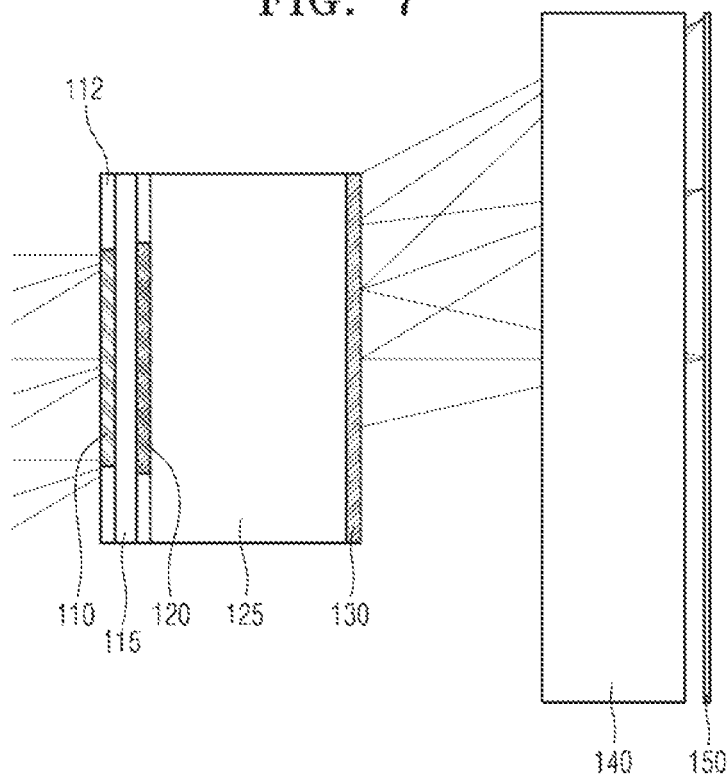
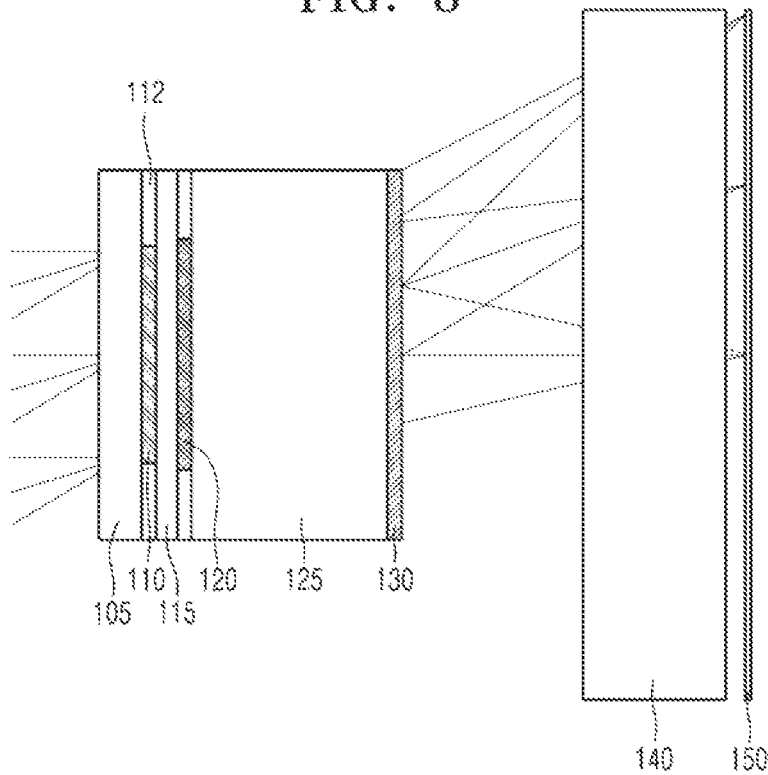

META LENS ASSEMBLY AND ELECTRONIC DEVICE INCLUDING THE SAME

CROSS-REFERENCE TO RELATED APPLICATIONS

This application is a Continuation of U.S. application Ser. No. 17/404,168, filed on Aug. 17, 2021, which is based on and claims priority under 35 U.S.C. § 119 to U.S. Provisional Application No. 63/077,151, filed on Sep. 11, 2020, in the USPTO, and Korean Patent Application No. 10-2021-0053757, filed on Apr. 26, 2021, in the Korean Intellectual Property Office, the disclosures of which are incorporated by reference herein in their entireties.

BACKGROUND

1. Field

The disclosure relates to a lens assembly including a meta lens and an electronic device including the lens assembly.

2. Description of the Related Art

As optical devices for capturing images or videos, a digital camera or a video camera, which includes an image sensor such as a charge coupled device (CCD) image sensor, a complementary metal-oxide semiconductor (CMOS) image sensor, etc., have been used. To obtain high-quality images and/or videos, a lens assembly including a combination of a plurality of lenses may be used in an optical device. The lens assembly may be mounted on an augmented reality (AR) or virtual reality (VR) device and a small-size electronic device such as a portable wireless terminal, etc.

A VR device displays a virtual image for a user and an AR device displays an AR image overlapping onto an image of the real world. In terms of a user, for an image display of the AR device or VR device, a small size and high performance of a display device are required. A mobile subminiature image sensor of about 1 inch or less generally needs at least three sheets of aspheric refractive lenses to image short-wavelength light in a near-infrared band. The refractive lens has a spatial restriction in assembly due to a minimum thickness of a lens edge for processing which results in accumulated lens thickness.

SUMMARY

Provided is a small lens assembly using a meta lens.
Provided is a wide-angle meta lens assembly.
Provided is an electronic device including a wide-angle meta lens assembly.

Additional aspects will be set forth in part in the description which follows and, in part, will be apparent from the description, or may be learned by practice of embodiments of the disclosure.

In accordance with an aspect of the disclosure, a meta lens assembly includes a first meta lens; a second meta lens arranged on an image side of the first meta lens; and a third meta lens arranged on an image side of the second meta lens, wherein the first meta lens, the second meta lens, and the third meta lens are arranged from an object side of the meta lens assembly to an image side of the meta lens assembly facing an image sensor, and wherein an interval between the first meta lens and the second meta lens is less than or equal to about ⅕ of an interval between the second meta lens and the third meta lens.

A phase profile of the second meta lens may have an inflection point at which the phase profile changes from concave to convex.

The inflection point of the second meta lens may be between a midpoint of a radius of the second meta lens and an edge of the second meta lens.

A phase profile of the third meta lens may have an inflection point at which the phase profile changes from convex to concave.

The inflection point of the third meta lens may be between a midpoint of a radius of the third meta lens and an edge of the third meta lens.

The meta lens assembly may further include an iris in a marginal portion of the first meta lens, wherein the iris includes a material that absorbs or reflects light, and wherein the iris defines a region in which the light passes through the first meta lens.

The first meta lens may have a first positive refractive power, the second meta lens may have a negative refractive power, and the third meta lens may have a second positive refractive power.

A first diameter of the first meta lens may be less than a third diameter of the third meta lens and a second diameter of the second meta lens may be less than the third diameter of the third meta lens.

The interval between the first meta lens and the second meta lens may be in a range of about 10 μm through about 100 μm.

A distance from the first meta lens to the image sensor may be less than or equal to about 1.7 mm.

The meta lens assembly may further include cover glass on an object side of the first meta lens.

The meta lens assembly may have an angle of view of about 40 degrees to about 80 degrees.

The meta lens assembly may further include cover glass between the third meta lens and the image sensor.

Each of the first meta lens, the second meta lens, and the third meta lens may include a plurality of nano structures.

The meta lens assembly may further include a first transparent substrate between the first meta lens and the second meta lens and a second transparent substrate between the second meta lens and the third meta lens.

The second meta lens may include a first region including first nano structures and a second region including second nano structures, wherein the first nano structures in the first region are arranged to gradually increase in size in a radial direction of the second meta lens, and wherein the second nano structures in the second region are arranged to gradually decrease in size in the radial direction of the second meta lens.

The third meta lens may include a third region including third nano structures and a fourth region including fourth nano structures, wherein the third nano structures in the third region are arranged to gradually decrease in size in a radial direction of the third meta lens, and wherein the fourth nano structures in the fourth region are arranged to gradually increase in size in the radial direction of the third meta lens.

In accordance with an aspect of the disclosure, an electronic device includes a meta lens assembly in which a plurality of meta lenses are arranged from an object side of the meta lens assembly to an image side of the meta lens assembly; an image sensor detecting an image of an object from incident light sequentially passing through the plurality of meta lenses; and an image signal processor storing or outputting the image, wherein the meta lens assembly includes a first meta lens; a second meta lens arranged on an image side of the first meta lens; and a third meta lens arranged on an image side of the second meta lens, wherein the first meta lens, the second meta lens, and the third meta lens are arranged from the object side of the meta lens assembly to the image side of the meta lens assembly facing the image sensor, and wherein an interval between the first meta lens and the second meta lens is about ⅕ of an interval between the second meta lens and the third meta lens.

A phase profile of the second meta lens may have an inflection point at which the phase profile changes from concave to convex.

The inflection point of the second meta lens may be between a midpoint of a radius of the second meta lens and an edge of the second meta lens.

A phase profile of the third meta lens may have an inflection point at which the phase profile changes from convex to concave.

The inflection point of the third meta lens may be between a midpoint of a radius of the third meta lens and an edge of the third meta lens.

The electronic device may further include an iris in a marginal portion of the first meta lens, wherein the iris includes a material that absorbs or reflects light, and wherein the iris defines a region in which the light passes through the first meta lens.

The first meta lens may have a first positive refractive power, the second meta lens may have a negative refractive power, and the third meta lens may have a second positive refractive power.

In accordance with an aspect of the disclosure, a camera includes at least one meta lens; and an image sensor, wherein a distance from an incident surface of the camera to the image sensor is less than or equal to about 1.7 mm, and wherein an angle of view of the camera is between about 40 degrees and about 80 degrees.

A diameter of the at least one meta lens may be less than a diagonal length of the image sensor.

The at least one meta lens may include a first meta lens, a second meta lens, and a third meta lens.

A distance between an incident surface of the first meta lens and an incident surface of the second meta lens may be in a range of about 10 μm to about 100 μm.

A distance between an incident surface of the second meta lens and an incident surface of the third meta lens may be in a range of about 100 μm to about 600 μm.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3 through 6 show arrangements of nano structures of a meta lens, according to embodiments;

FIGS. 7 through 10 show a meta lens assembly according to an embodiment;

DETAILED DESCRIPTION

Figure 1:
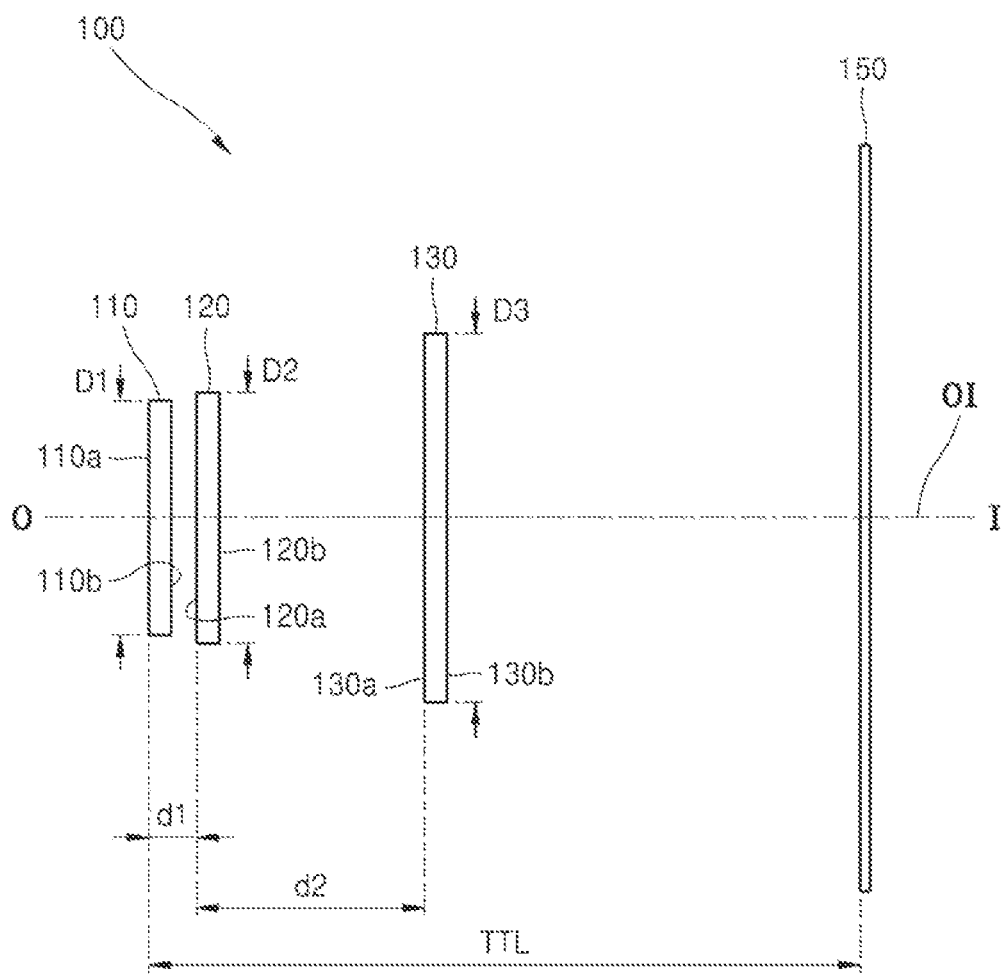
FIG. 1 schematically shows a meta lens assembly according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the disclosure. The same or similar reference denotations may be used to refer to the same or similar components throughout the specification and the drawings. It is to be understood that the singular forms include plural references unless the context clearly dictates otherwise. In embodiments of the disclosure, an expression such as "A or B," or "A and/or B," etc., may include all possible combinations of together listed items. Expressions such as "first," "second," "primarily," or "secondary," used herein may represent various elements regardless of order and/or importance and do not limit corresponding elements. When it is described that a (first) component is "operatively or communicatively coupled with/to" or "connected" to another (second) component, the component can be directly connected to the other component or can be connected to the other component through another (third) component.

In embodiments of the disclosure, an expression "configured to (or set)" may be replaced with, for example, "suitable for," "having the capacity to," "adapted to," "made to," "capable of," or "designed to" according to a situation. Alternatively, in some situations, an expression "apparatus configured to" may mean that the apparatus "can" operate together with another apparatus or component. For example, a phrase "a processor configured (or set) to perform A, B, and C" may be a dedicated processor (e.g., an embedded processor, etc.) for performing a corresponding operation or a generic-purpose processor (such as a central processing unit (CPU) or an AP) that can perform a corresponding operation by executing at least one software program stored at a memory device. A term "configured to (or set)" does not always mean only "specifically designed to" by hardware.

A curvature radius, a thickness, a total track length (TTL), a focal length, etc., of a lens may have a millimeter (mm) unit, unless specially mentioned. The thickness of the lens, an interval between lenses, and the TTL of the lens may be a distance measured with respect to an optical axis of the lens. Moreover, in a description of the shape of a lens, a convex shape of a surface may mean that an optical axis portion of the surface is convex, and a concave shape of a surface may mean that an optical axis portion of the surface is concave. Thus, even when the surface (the optical axis portion thereof) of the lens is described as having a convex shape, an edge portion (a portion apart from the optical axis portion of the surface by a certain distance) of the lens may be concave. Likewise, even when the surface (the optical axis portion thereof) of the lens is described as having a concave shape, an edge portion (a portion apart from the optical axis portion of the surface by a certain distance) of the lens may be convex. In addition, when a surface directed to an image side has a convex shape, it may mean that the surface has a shape that is convex (protrudes) toward an image side; when a surface directed toward an object side has a convex shape, it may mean that the surface has a shape that is convex (protrudes) toward the object side.

Examples of the electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include an accessory-type device (e.g., a watch, a ring, a bracelet, an anklet, a necklace, glasses, contact lenses, or a head-mounted device (HMD), etc.), a fabric- or clothes-integrated device (e.g., electronic clothes), a body attaching-type device (e.g., a skin pad, tattoo, etc.), or a body implantable device. In some embodiments of the disclosure, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™, PlayStation™, etc.), an electronic dictionary, an electronic key, a camcorder, or an electronic frame.

The electronic device may include various medical equipment (for example, various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global positioning system (global navigation satellite system (GNSS)), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). The electronic device may include a part of furniture, a building/structure, or a vehicle, an electronic board, an electronic signature receiving device, a projector, and/or various measuring instruments (e.g., a water, electricity, gas, electric wave measuring device, etc.). The electronic device may be flexible or may be a combination of two or more of the above-described various devices. The term "user" may refer to a person who uses the electronic device or a device using the electronic device (e.g., an artificial intelligence electronic device). A representative example of the electronic device may include an optical device (a camera, etc.,), and the following description will be made based on an embodiment of the disclosure where a lens assembly is mounted on the optical device.

When embodiments of the disclosure are described, some values, etc., may be provided, but values do not limit the scope of the present disclosure unless described in the claims.

FIG. 1 shows a meta lens assembly according to an embodiment of the disclosure.

Referring to FIG. 1, a lens assembly 100 may include a first meta lens 110, a second meta lens 120, and a third meta lens 130, which are arranged from an object side O of the lens assembly 100 to an image side I of the lens assembly 100. The first meta lens 110, the second meta lens 120, and the third meta lens 130 may include nano structures to be described later. The first meta lens 110 may include an incident surface 110a on which light is incident and an exit surface 110b from which light exits, the second meta lens 120 may include an incident surface 120a and an exit surface 120b, and the third meta lens 130 may include an incident surface 130a and an exit surface 130b. The nano structures may be included on an incident surface and/or an exit surface of each meta lens.

The lens assembly 100 may have an optical axis OI from the object (or an external object) side O to the image side I. When a configuration of each lens is described, the object side O may indicate a direction in which the object is placed, and the image side I may indicate a direction in which an imaging plane on which an image is formed is placed. The surface of the lens directed to the object side O, which is a surface on a side where the object is placed with respect to the optical axis OI, may mean a surface to which light is incident in the drawing, and the surface directed to the image side I, which is a surface on a side where the imaging plane is placed with respect to the optical axis OI, may mean a surface from which light exits. The imaging plane may be a part of an imaging device or the image sensor 150 on which an image is formed.

The image sensor 150, which is a sensor mounted on a circuit board and arranged in alignment with the optical axis OI of the meta lens assembly 100, may react to light. The image sensor 150 may be a sensor such as, for example, a complementary metal-oxide semiconductor (CMOS) image sensor or a charge coupled device (CCD) image sensor, and may convert an object image into an electrical image signal. The image sensor 150 may detect contrast information, grayscale information, color information, and so forth regarding an object from light passing through the first meta lens 110, the second meta lens 120, and the third meta lens 130 and obtain the object image.

To describe meta lenses, a part close to the optical axis OI of each meta lens may be referred to as a chief portion and a part far from the optical axis OI (or an edge portion of the lens) may be referred to as a marginal portion. The chief portion may be a portion intersecting with the optical axis Oi in each of the first meta lens 110, the second meta lens 120, and the third meta lens 130, and the marginal portion may include a portion away from the optical axis OI by a certain distance, e.g., an end portion farthest from the optical axis OI of each of the first meta lens 110, the second meta lens 120, and the third meta lens 130, in each of the first meta lens 110, the second meta lens 120, and the third meta lens 130.

The first meta lens 110 may have a positive refractive power (e.g., a first positive refractive power), the second meta lens 120 may have a negative refractive power, and the third meta lens 130 may have a positive refractive power (e.g., a second positive refractive power). A lens having a positive refractive power is a lens based on the principle of a convex lens having a positive focal distance and may pass light incident in parallel to the optical axis OI to collect the light. On the other hand, a lens having a negative refractive power is a lens based on the principle of a concave lens, and may pass light incident in parallel to disperse the light.

The first meta lens 110, the second meta lens 120, and the third meta lens 130 may include nano structures that modulate a phase, polarization, and/or amplitude of the wavelength of incident light. The nano structures may change the wave front of light passing through the first meta lens 110, the second meta lens 120, and the third meta lens 130 to be different from the wave front of the incident light.

Figure 2:
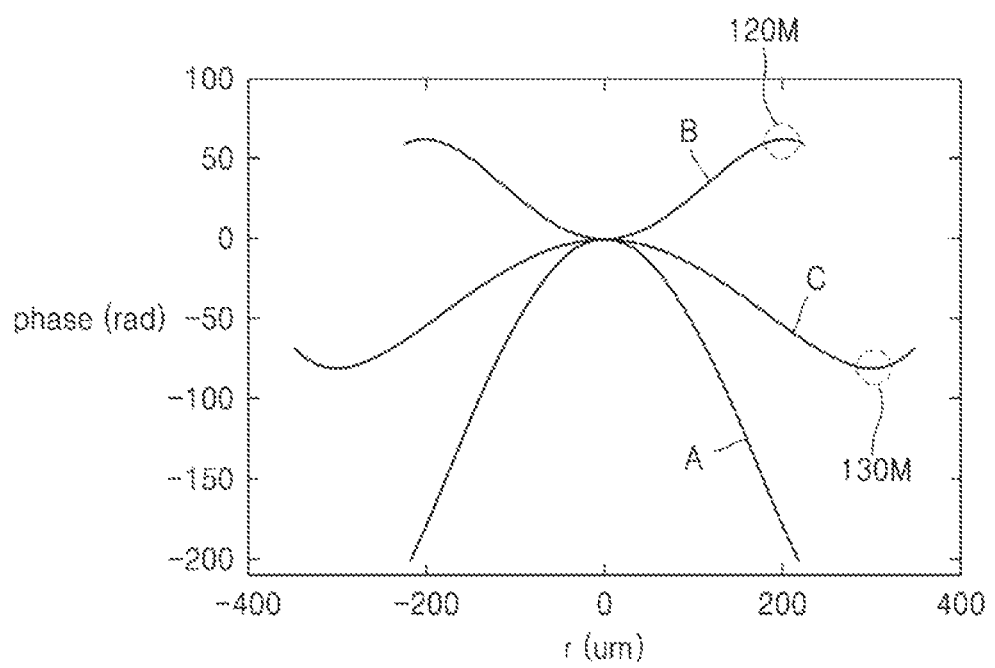
FIG. 2 shows a phase profile with respect to a radius of a metal lens assembly, according to an embodiment.

FIG. 2 shows a phase profile with respect to a radius of each of the first meta lens 110, the second meta lens 120, and the third meta lens 130. A indicates a phase profile of the first metal lens 110, B indicates a phase profile of the second meta lens 120, and C indicates a phase profile of the third meta lens 130. The first meta lens 110 may have a positive refractive power and a phase profile convex upward. The second meta lens 120 may have a negative refractive power and a phase profile convex downward. The third meta lens 130 may have a positive refractive power and a phase profile convex upward. The second meta lens 120 may have a phase profile convex downward in the chief portion and a phase profile convex upward in a marginal portion 120M. As such, the second meta lens 120 may have an inflection point with a negative refractive power in the chief portion and a positive refractive power in the marginal portion. The third meta lens 130 may have a phase profile convex upward in the chief portion and a phase profile convex downward in marginal portion 130M. As such, the third meta lens 130 may have an inflection point with a positive refractive power in the chief portion and a negative refractive power in the marginal portion. The inflection point may indicate a point at which the phase profile changes from convex to concave or a point at which the phase profile changes from concave to convex. The inflection point may be between a ½ point (e.g., a midpoint) of a radius of a meta lens and an edge of the meta lens.

The meta lens assembly 100 according to an embodiment of the disclosure may implement a wide-angle imaging system. The meta lens assembly 100 may have an angle of view of about 40 to about 80 degrees. In other words, an angular extent of an object that is imaged by the meta lens assembly 100 may have a value of between about 40 degrees and about 80 degrees. A diameter D1 (e.g., a first diameter) of the first meta lens 110 and a diameter D2 (e.g., a second diameter) of the second meta lens 120 each may be less than a diameter D3 (e.g., a third diameter) of the third meta lens 130. For example, D1<D2<D3. The diameter D1 of the first meta lens 110, the diameter D2 of the second meta lens 120, and the diameter D3 of the third meta lens 130 each may be less than about 1 mm. The first meta lens 110, the second meta lens 120, and the third meta lens 130 each may have a diameter that is less than a diagonal length of the image sensor 150.

A distance d1 between the first meta lens 110 and the second meta lens 120 may be in a range of about 10 µm to about 100 µm. The distance d1 between the first meta lens 110 and the second meta lens 120 may indicate a distance between the incident surface 110a of the first meta lens 110 and the incident surface 120a of the second meta lens 120. A distance d2 between the second meta lens 120 and the third meta lens 130 may be in a range of about 100 µm-about 600 µm. The distance d2 may indicate a distance between the incident surface 120a of the second meta lens 120 and the incident surface 130a of the third meta lens 130. A TTL from the incident surface 110a of the first meta lens 110 to the image sensor 150 may be less than or equal to about 1.7 mm.

Figure 3:
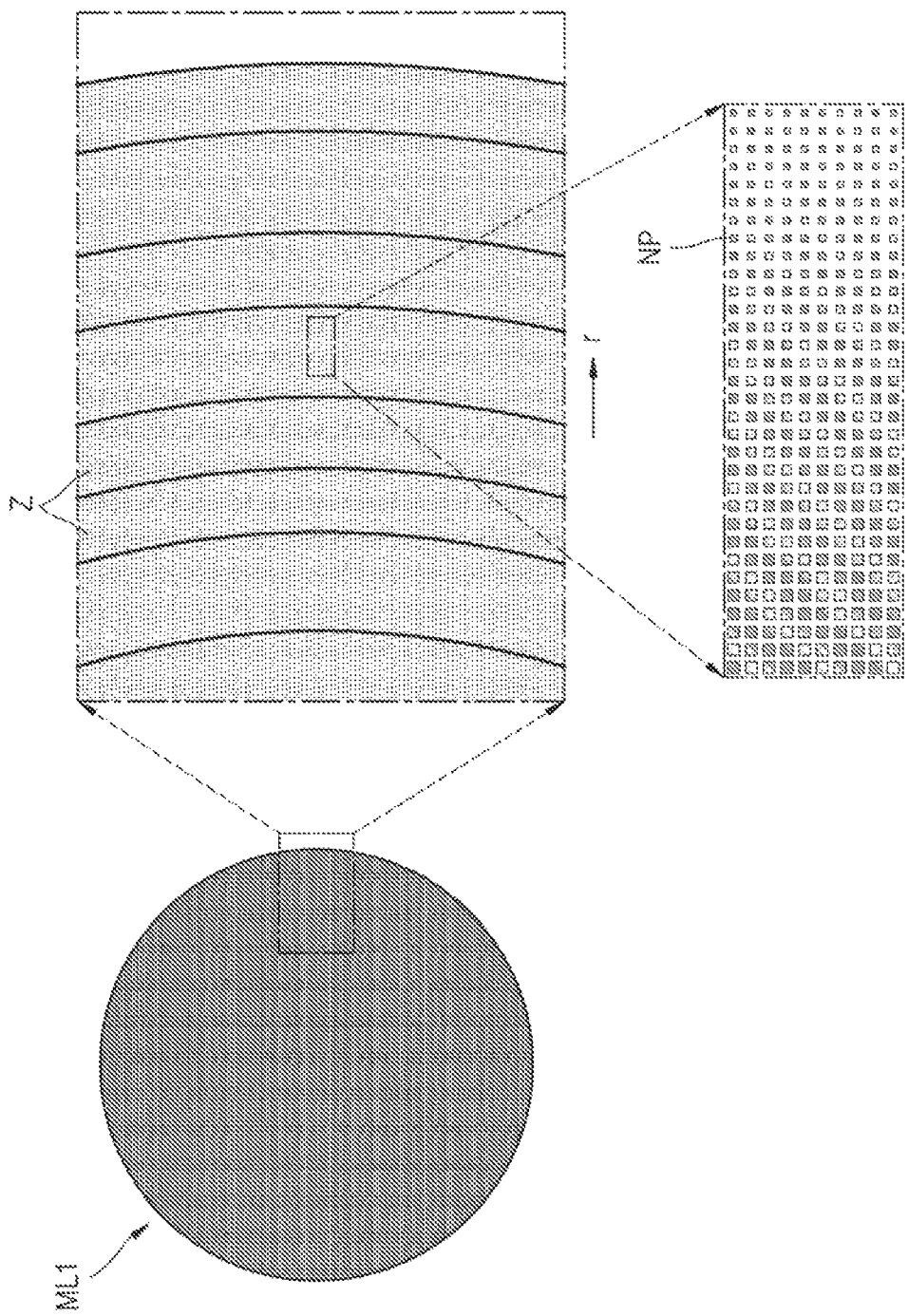

FIG. 3 shows an example of a meta lens. A meta lens ML1 may include a plurality of nano structures NP. In the meta lens ML1, the nano structures NP may be arranged to gradually decrease in size from the center of the lens. The meta lens ML1 may include a plurality of zones Z in a radial direction r, and the pattern of gradually decreasing in size may be repeated for each zone Z. When the meta lens ML1 has a phase delay profile that decreases in the radial direction r from the center of the meta lens ML1 in each zone Z, the meta lens ML1 may operate as a convex lens. The zone Z may change in width when a phase of the nano structures NP changes to 2 πn (n is an integer). Herein, the size of the nano structures NP may indicate a width of the nano structures NP, a pitch between adjacent nano structures NP, a height of the nano structures NP, and so forth.

Figure 4:
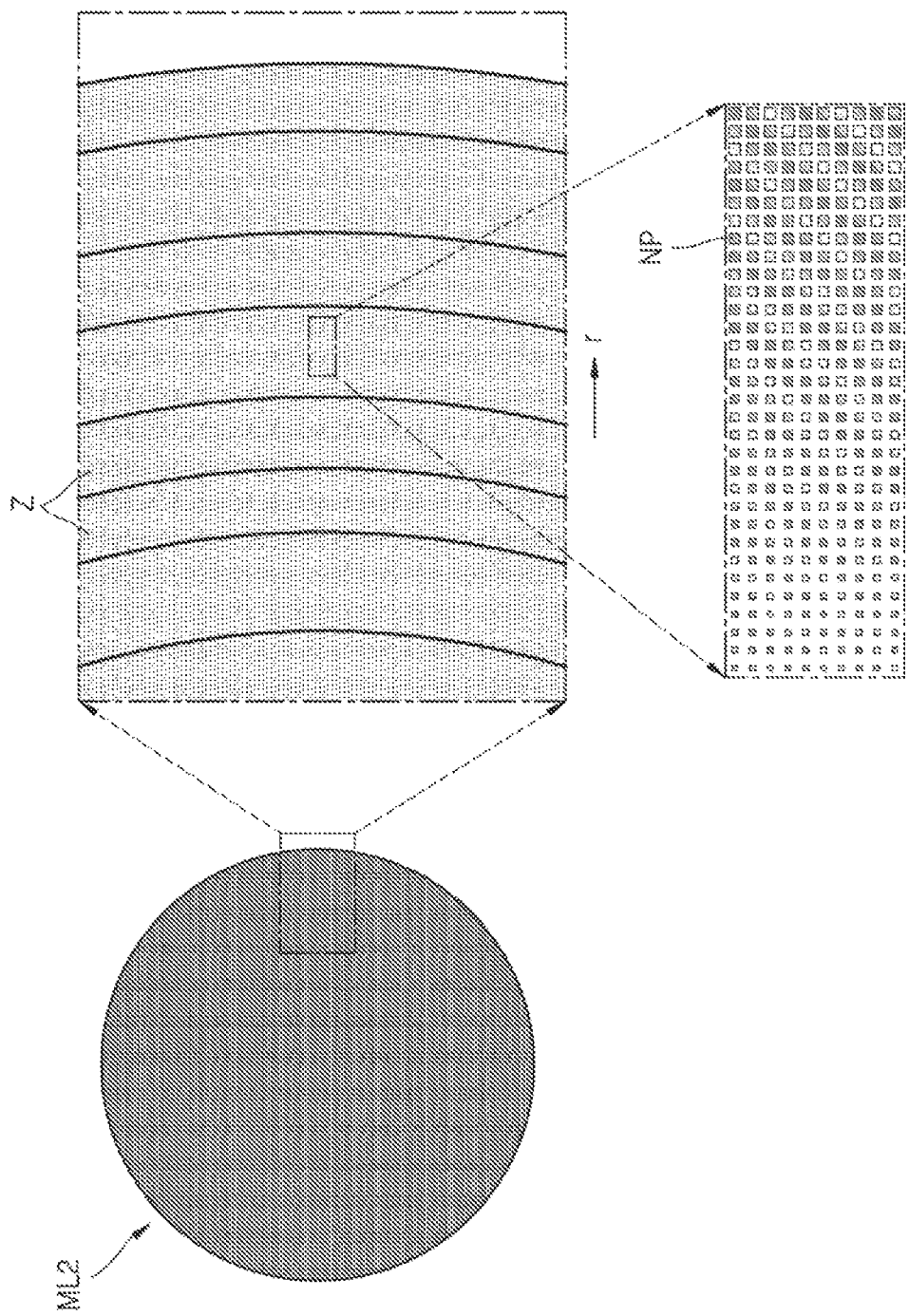

FIG. 4 shows another example of a meta lens. A meta lens ML2 may include a plurality of nano structures NP. In the meta lens ML2, the nano structures NP may be arranged to gradually increase in size from the center of the meta lens ML2 in the radial direction r, and the pattern of gradually increasing in size may be repeated for each zone Z. When the meta lens ML2 has a phase delay profile that increases in the radial direction r from the center of the meta lens ML2 in each zone Z, the meta lens ML2 may operate as a concave lens.

Figure 5:
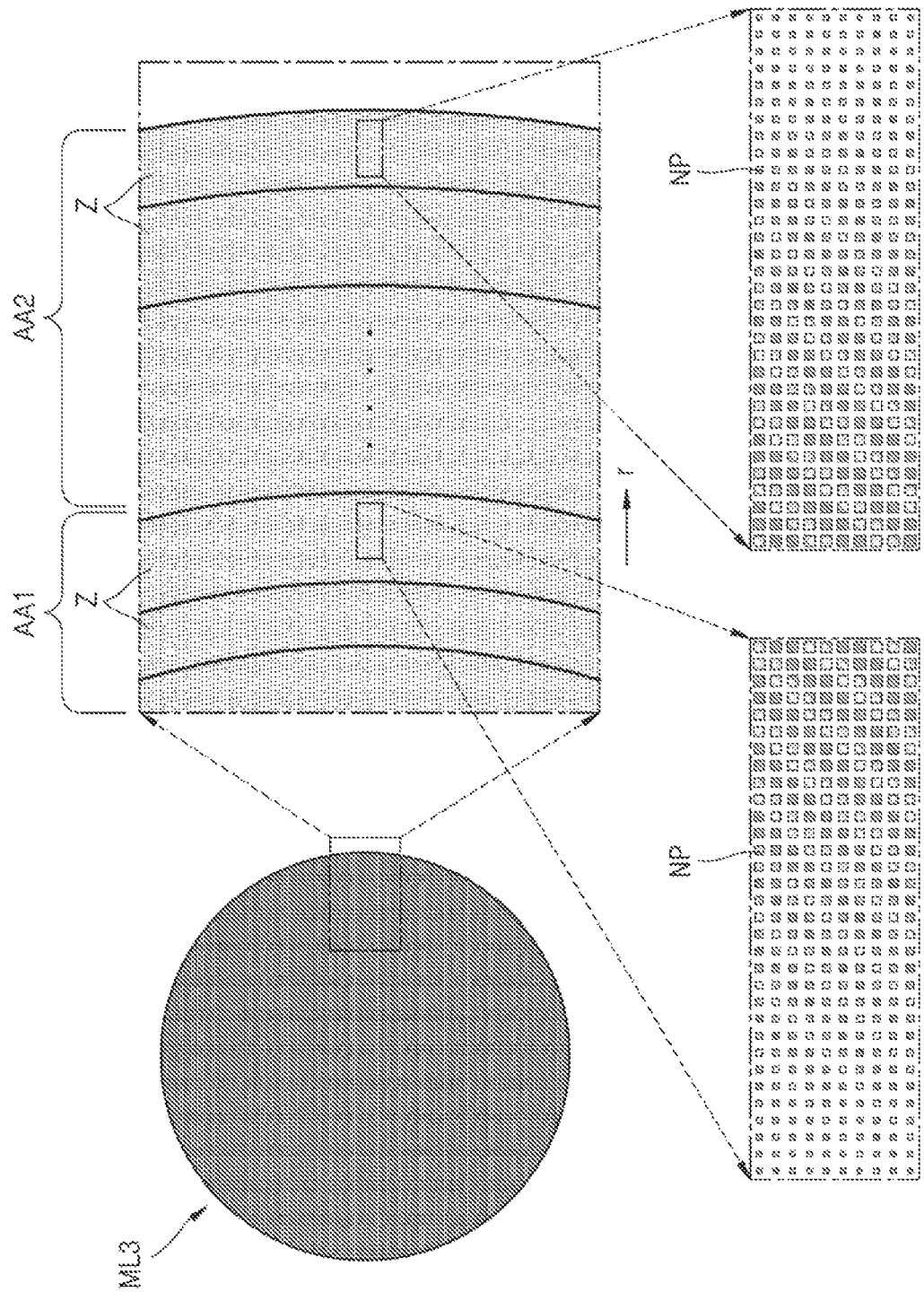

FIG. 5 shows another example of a meta lens. A meta lens ML3 may include a first region AA1 and a second region AA2. The arrangement of the nano structures NP (e.g., first nano structures) structured to gradually increase in size in the radial direction r from the center of the meta lens ML3 may be repeated for each zone Z in the first region AA1, and the arrangement of the nano structures NP (e.g., second nano structures) structured to gradually decrease in size in the radial direction r of the meta lens ML3 may be repeated for each zone Z in the second region AA2. The meta lens ML3 may have an inflection point at which a phase profile changes from convex to concave. The zone Z may change in width when a phase of the nano structures NP changes to 2 πn (n is an integer). For example, a width of the zone Z may increase or decrease with respect to a position of the inflection point. The meta lens ML3 may correspond to the second meta lens 120 of FIG. 1, and the second region AA2 may correspond to the marginal portion 120M of FIG. 2.

FIG. 6 shows another example of a meta lens. A meta lens ML4 may include a third region AA3 and a fourth region AA4. The arrangement of the nano structures NP (e.g., third nano structures) structured to gradually decrease in size in the radial direction r from the center of the meta lens ML4 may be repeated for each zone Z in the third region AA3, and the arrangement of the nano structures NP (e.g., fourth nano structures) structured to gradually increase in size in the radial direction r from the center of the meta lens ML4 may be repeated for each zone Z in the fourth region AA4. The meta lens ML4 may correspond to the third meta lens 130 of FIG. 1, and the fourth region AA4 may correspond to a marginal portion 130M of FIG. 2.

Referring to FIG. 7, a first transparent substrate 115 may be provided between the first meta lens 110 and the second meta lens 120, and a second transparent substrate 125 may be provided between the second meta lens 120 and the third meta lens 130. Cover glass 140 may be included between the third meta lens 130 and the image sensor 150. The first transparent substrate 115 and the second transparent substrate 125 may support the first meta lens 110, the second meta lens 120, and the third meta lens 130. The lens assembly 100 may further include an iris 112. The iris 112 may be in various positions and may be provided in plural. For example, the iris 112 may be around the first meta lens 110 to adjust the amount of light arriving on an image formation surface of the image sensor 150. The iris 112 may be formed of a material that absorbs or reflects light to prevent light from passing therethrough.

FIG. 8 illustrates an example further including cover glass in the meta lens assembly illustrated in FIG. 7. Cover glass 105 may be provided on an incident surface of the first meta lens 110. The cover glass 105 may protect the first meta lens 110 from an external environment and may prevent the first meta lens 110 from being damaged.

Figure 9:
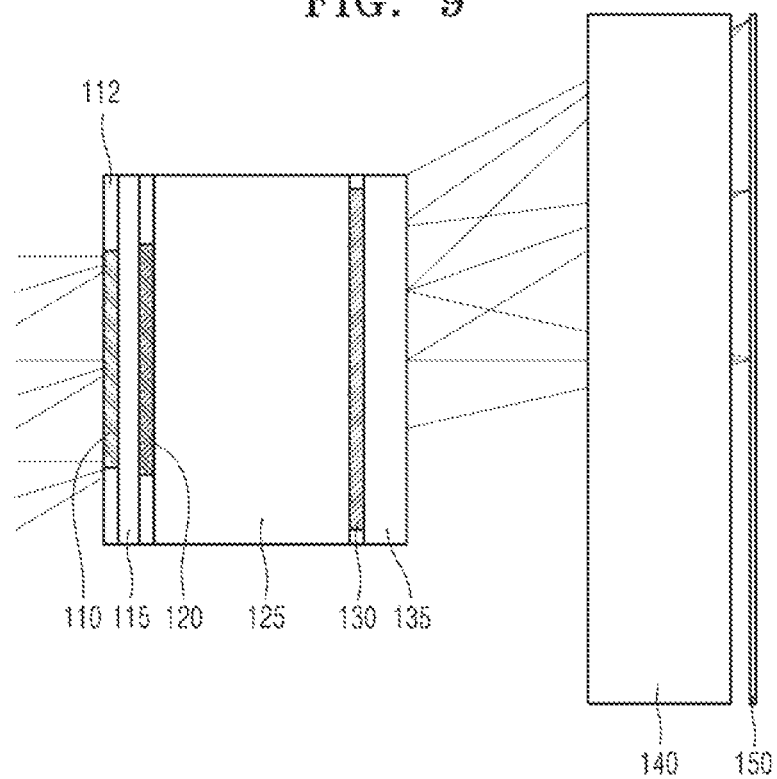

FIG. 9 illustrates an example further including a third transparent substrate in the meta lens assembly illustrated in FIG. 7. A third transparent substrate 135 may be provided on an exit surface of the third meta lens 130. The third transparent substrate 135 may support the third meta lens 130.

Figure 10:
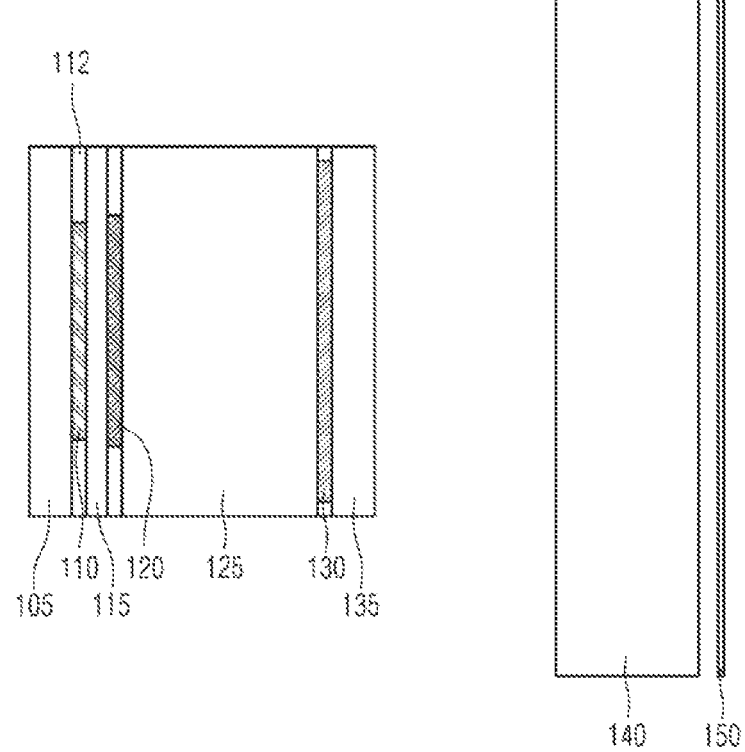

FIG. 10 illustrates an example further including the cover glass 105 on an incident surface of the first meta lens 110 of the meta lens assembly illustrated in FIG. 9. In the meta lens assembly, the first meta lens 110, the second meta lens 120, and the third meta lens 130 each may include a transparent substrate and cover glass on an incident surface and an exit surface, respectively. The cover glass 105 and the third transparent substrate 135 each may have a thickness of about 0.01 mm through about 0.3 mm. The cover glass 140 may have a thickness of about 0.2 mm through about 0.5 mm. A bandpass filter may be further included between the third meta lens 130 and the image sensor 150. The bandpass filter may operate in a bandwidth of about 60 nm with respect to a center wavelength of incident light.

The meta lens assembly according to various embodiments of the disclosure may be applied to a subminiature image sensor. Three sheets of meta lenses may be stacked to provide a small-size lens module, thus implementing a wide-angle imaging system. As the size of the image sensor decreases, a small-size lens assembly corresponding to the size may be required. However, an optical lens module based on a refractive lens may be difficult to apply to a small-size camera module package due to a minimum thickness of an edge of the lens, a restriction of separation between lenses, etc. By including an ultra-thin meta lens having a thickness of several pm or less, the meta lenses may be stacked based on a wafer level process, thereby implementing an imaging system not restricted by the size of the refractive lens. The meta lens assembly according to an embodiment of the disclosure may satisfy various details (F-number, a field of view (FOV), a TTL, a modulation transfer function (MTF), distortion, a refractive index (RI), etc.) of the imaging system. The meta lens assembly according to an embodiment of the disclosure may have an effective focal distance of about 1 mm or less, and may implement a bright lens having an F-number of about 2.2 or less. Both of optical distortion and TV distortion in the meta lens assembly according to an embodiment of the disclosure may satisfy |Distortion|<5%. The meta lens assembly according to an embodiment of the disclosure may operate at a wide angle to collect even light having a large chief ray angle in an edge of the image sensor, thus satisfying a relative illumination in 1.0 F>40%. 1.0 F may indicate a maximum height in the center of the image sensor.

Figure 11A:
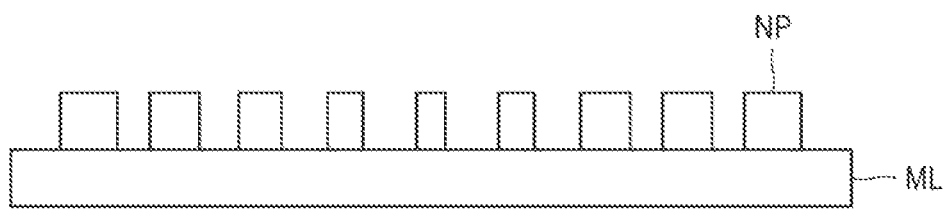
FIG. 11A is a cross-sectional view of a meta lens assembly according to an embodiment.

FIG. 11A shows an example of the meta lens ML. The meta lens ML may include the nano structures NP. While it is illustrated in FIG. 11A as an example that the nano structures NP are provided on one layer, the nano structures NP may also be provided in two layers or three layers. By adjusting the size, a spacing, a height, etc., of the nano structures NP, the refractive power of the meta lens ML may be adjusted.

Figure 11B:
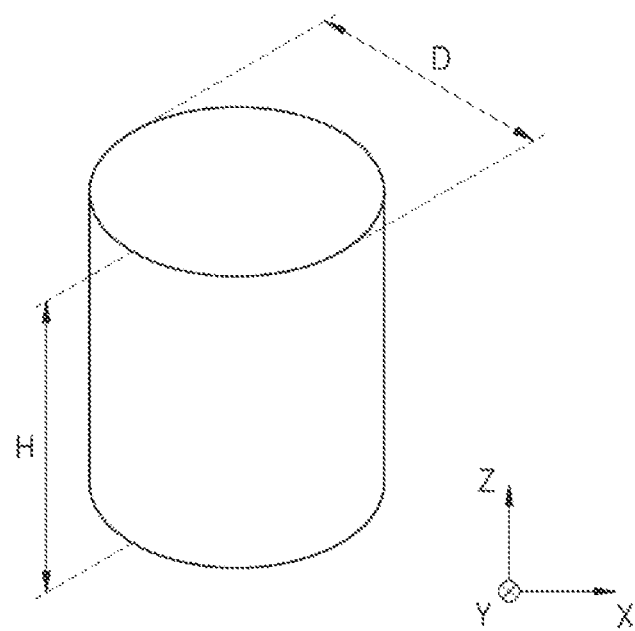
FIG. 11B shows an example of a nano structure included in a meta lens of a meta lens assembly, according to an embodiment.

FIG. 11B is a perspective view showing an example form of a nano structure adoptable in a meta lens of a lens assembly, according to an embodiment of the disclosure. Referring to FIG. 11B, the nano structure may have a cylindrical shape with a diameter D and a height H. At least one of the diameter D or the height H may be a sub-wavelength. The diameter D may vary with a position in which the nano structure is arranged.

The nano structure may be formed in a pillar shape having various cross-sectional shapes. FIGS. 12A through 12H are plane views showing an example form of a nano structure adoptable in a meta lens of a lens assembly, according to an embodiment of the disclosure.

Figure 12A:
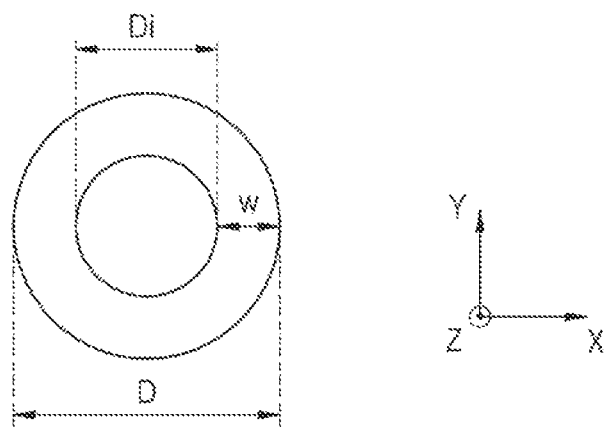
FIGS. 12A through 12H show various examples of a nano structure included in a meta lens of a meta lens assembly, according to an embodiment.
Figure 12B:
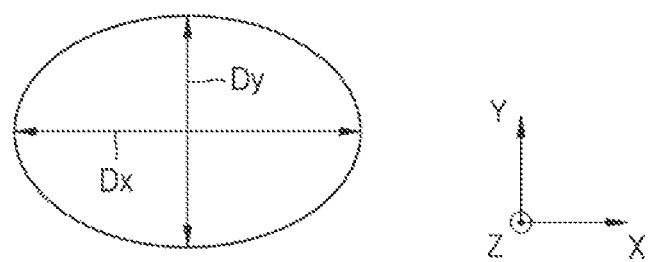
Figure 12C:
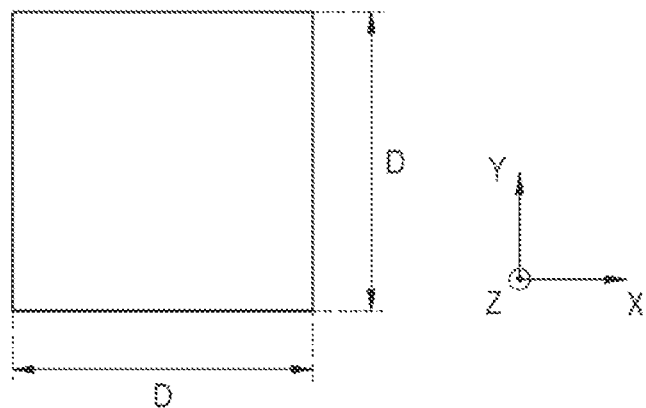
Figure 12D:
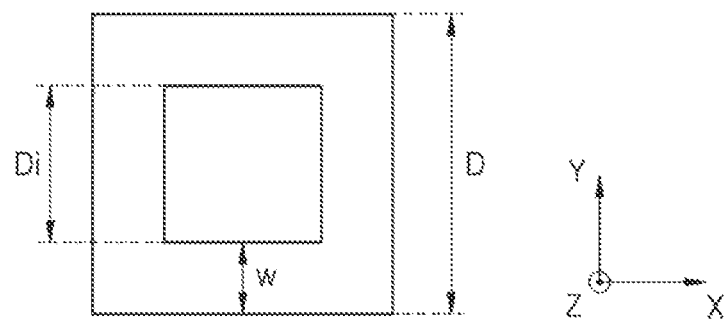
Figure 12E:
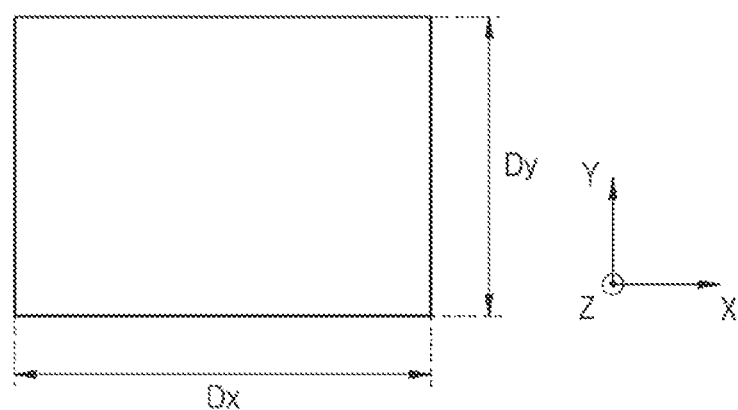
Figure 12F:
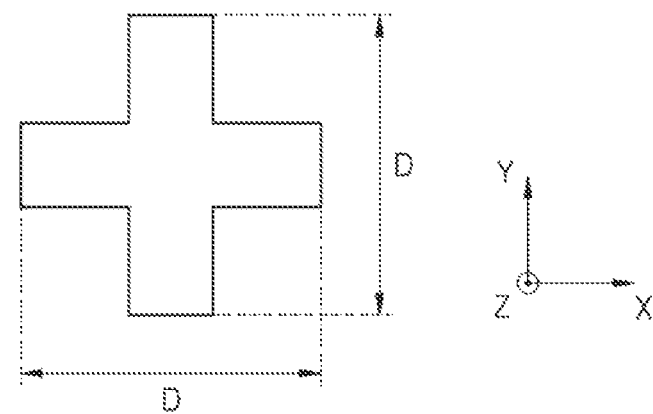
Figure 12G:
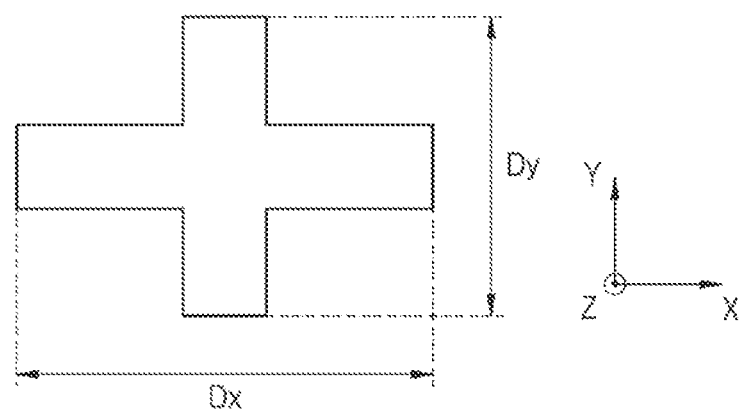
Figure 12H:
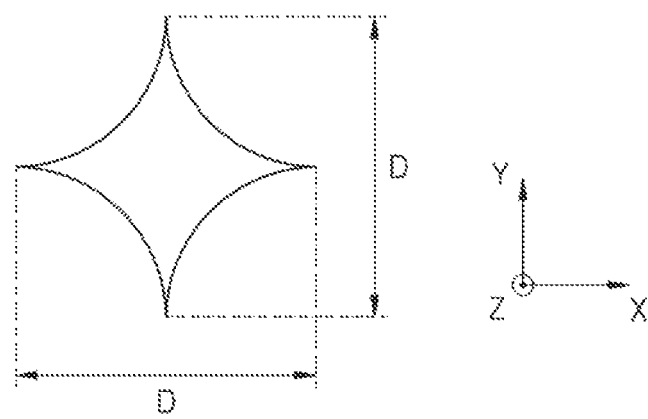

As shown in FIG. 12A, a cross-sectional shape of the nano structure may have a circular ring shape with an outer diameter D and an inner diameter Di. A width of a ring, w, may be a sub-wavelength. As shown in FIG. 12B, the cross-sectional shape of the nano structure may be an oval shape with different major-axis and minor-axis lengths Dx and Dy in a first direction x and a second direction y. As shown in FIGS. 12C, 12D, and 12F, the cross-sectional shape of the nano structure may be a square shape, a square ring shape, or a cross shape. As shown in FIGS. 12E and 12G, the cross-sectional shape of the nano structure may be a rectangular shape or a cross shape with the different major-axis and minor-axis lengths Dx and Dy in the first direction x and the second direction y. As shown in FIG. 12H, the cross-sectional shape of the nano structure may be a shape having a plurality of concave circular arcs.

Figure 13:
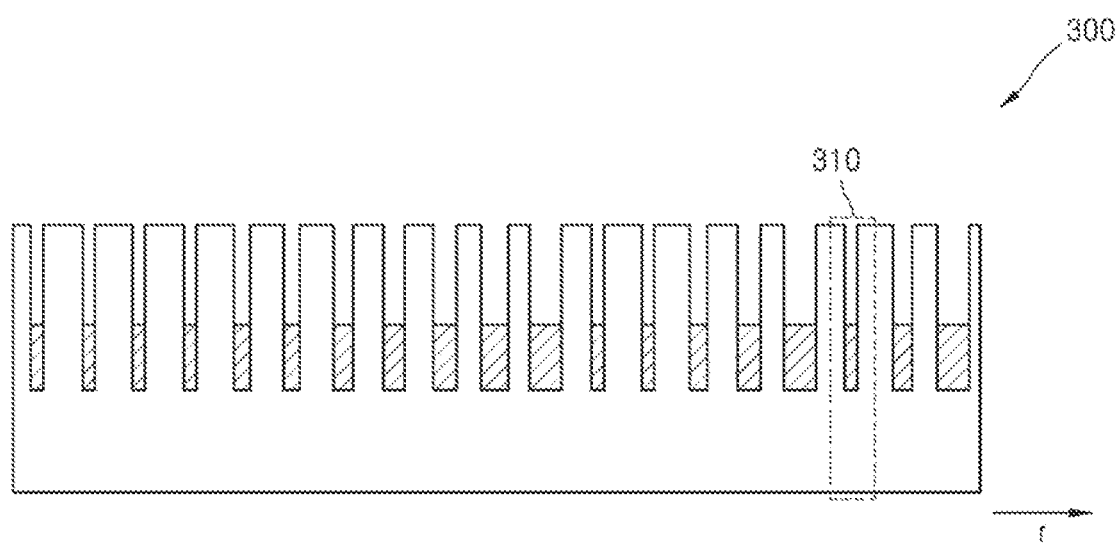
FIG. 13 is a cross-sectional view of a meta lens assembly according to an embodiment.
Figure 14A:
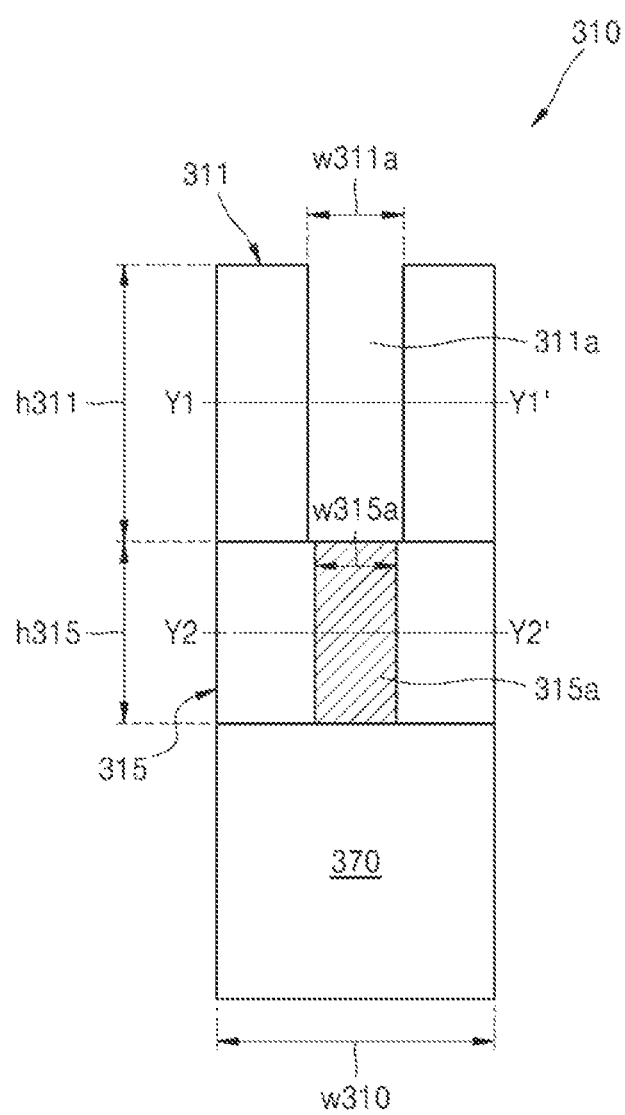
FIG. 14A shows a cross-section of a nano structure of FIG. 13.
Figure 14B:
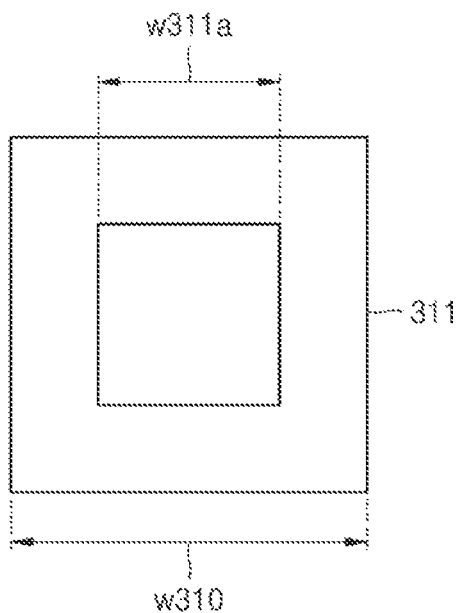
FIGS. 14B and 14C are cross-sectional views of a first phase shift layer and a second phase shift layer of the nano structure of FIG. 14A.
Figure 14C:
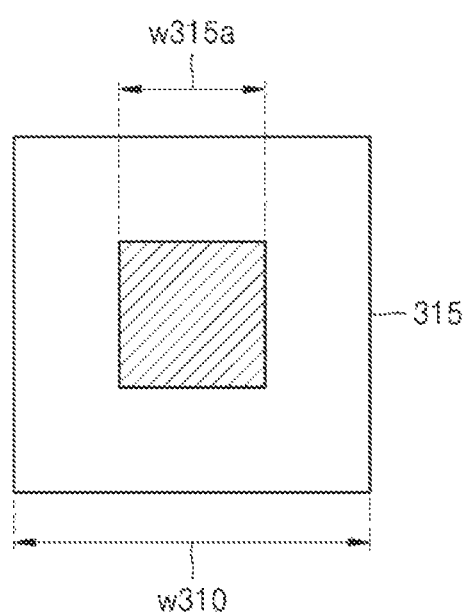

FIG. 13 is a vertical cross-sectional view of a meta lens 300. FIG. 13 shows an example where nano structures are arranged in two layers. FIG. 13 shows a structure where nano structures are arranged in the radial direction r from the center of the meta lens 300. FIG. 14A shows in more detail a cross-section of a nano structure 310, and FIGS. 14B and 14C are horizontal cross-sectional views taken along a line Y1-Y1' and a line Y2-Y2' of FIG. 14A, respectively.

The nano structure 310 may include a first phase shift layer 311, a second phase shift layer 315, and a support layer 370. The first phase shift layer 311 may shift a phase in reaction with light incident to the nano structure 310. The light with the shifted phase may be incident to the second phase shift layer 315 that may further shift the phase of the light. As a result, the incident light may sequentially interact with the first phase shift layer 311 and the second phase shift layer 315 and thus may be emitted in a phase-shifted form. FIGS. 13 and 14A show a support layer 370 supporting the first phase shift layer 311 and the second phase shift layer 315, but the support layer 370 may be omitted.

Each of the first phase shift layer 311 and the second phase shift layer 315 may include a combination of materials having different refractive indexes. According to an embodiment of the disclosure shown in FIGS. 13 and 14A, each of the first phase shift layer 311 and the second phase shift layer 315 may have a form in which one material surrounds another material. For example, the first phase shift layer 311 and the second phase shift layer 315 each may include an inner column and a structure surrounding the inner column. More specifically, the first phase shift layer 311 may have a form of a hollow structure, e.g., a form in which an air column 311a is surrounded by the structure. On the other hand, the second phase shift layer 315 may have a form of an inner-filled structure, e.g.i.e., a form in which an inner material of a column shape 315a is surrounded by a structure of another material. The structures surrounding the inner column of the first phase shift layer 311 and the second phase shift layer 315 may be formed of an identical material, e.g., a dielectric ($SiO_2$, etc.), glass (fused silica, BK7, etc.), quartz, polymer (polymethyl methacrylate (PMMA), SU-8, etc.), plastic, and/or a semiconductor material. The material of the inner column may include crystalline silicon (c-Si), polycrystalline silicon (poly Si), amorphous silicon (Si), $Si_3N_4$, GaP, GaAs, Tix, Alb, Alas, AlGaAs, AlGaInP, BP, and/or $ZnGeP_2$. For example, the inner column of the second phase shift layer 315 may be formed of $TiO_2$.

The shape, size, and height of the cross-section of each of the first phase shift layer 311 and the second phase shift layer 315 and the shape, size, and height of the cross-section of each of the first inner column 311a and a second inner column 315a may be properly designed based on characteristics of a selected material. For example, cross-sections of the first phase shift layer 311 and the second phase shift layer 315 may globally have shapes of a square, a rectangle, a parallelogram, a regular hexagon, etc., and FIGS. 14B and 14C each show an example of a square cross-section. A width w310 of each of the first phase shift layer 311 and the second phase shift layer 315 may be less than a wavelength of incident light. The width w310 of each of the first phase shift layer 311 and the second phase shift layer 315 designed to change the phase of visible light may be less than about 400 nm or about 300 nm, e.g., about 250 nm.

Figure 14D:
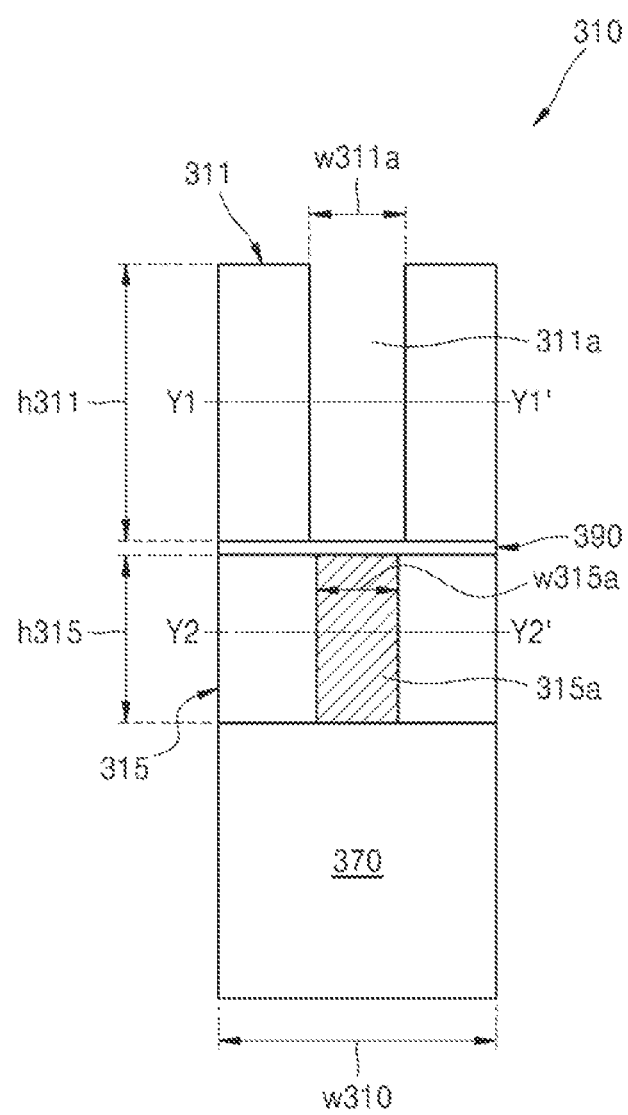
FIG. 14D is a cross-sectional view of a nano structure further including a spacer layer.

The cross-section of each of the first inner column 311a and the second inner column 315a may have a square shape, a circular shape, a rectangular shape, a hollow circular shape, a hollow quadrangular shape, etc., and FIGS. 14B and 14C show an example of square cross-sections. Heights h311 and h315 of the first inner column 311a and the second inner column 315a may be twice the widths w311a and w315a thereof to avoid optical resonance therein. The heights h311 and h315 of the first inner column 311a and the second inner column 315a may be optimized through repeated simulation based on characteristics of a material and a manufacturing process. Although the heights of the first inner column 311a and the second inner column 315a are shown in FIG. 14A as being identical to the heights of the first phase shift layer 311 and the second phase shift layer 315, the heights of the first inner column 311a and the second inner column 315a may be different from the heights of the first phase shift layer 311 and the second phase shift layer 315. For example, the heights of the first inner column 311a and the second inner column 315a may be less than the heights of the first phase shift layer 311 and the second phase shift layer 315. The height h311 of the square first phase shift layer 311 and the first inner column 311a designed to interact with visible light may be, for example, about 3000 nm, and the height h315 of the second phase shift layer 315 and the second inner column 315a may be, for example, about 1500 nm. According to this example, the height h311 of the first phase shift layer 311 interacting with incident light first may be greater than the height h315 of the second phase shift layer 315. A spacer layer may be further included between the first phase shift layer 311 and the second phase shift layer 315 and/or between the first inner column 311a and the second inner column 315a. FIG. 14D shows an example where a spacer layer 390 is included between the first phase shift layer 311 and the second phase shift layer 315.

The support layer 370 may support the first phase shift layer 311 and the second phase shift layer 315 and may be formed of a dielectric ($SiO_2$, etc.), glass (fused silica, BK7, etc.), quartz, polymer (PMMA, SU-8, etc.), plastic, and/or a semiconductor material. The support layer 370 may have a thickness of about 0.1 mm through about 1.0 mm.

The structures and the support layer 370, which surround the first inner column 311a and the second inner column 315a of the first phase shift layer 311 and the second phase shift layer 315, may be formed of an identical material, e.g., $SiO_2$. The support layer 370 may be formed of a material that is different from that of the structures of the first phase shift layer 311 and the second phase shift layer 315, and may be omitted as mentioned above.

The lens assembly according to the foregoing example embodiments of the disclosure may be employed in various optical devices and electronic devices such as a camera, etc. The electronic device may be, but is not limited to, a smartphone, a mobile phone, a cellular phone, a personal digital assistant (PDA), a laptop, a personal computer (PC), various portable devices, VR, AR, or other mobile or non-mobile computing devices.

The lens assembly described with reference to FIGS. 1 through 14D may be used, being mounted on an electronic device (an optical device, etc.). The electronic device may further include an image sensor and an application processor (AP), and control multiple hardware or software components connected to the AP by driving an operating system (OS) or an application program through the AP, and perform processing and operations with respect to various data. The AP may further include a graphic processing unit (GPU) and/or an image signal processor. When the image signal processor is included in the AP, an image (or video) obtained by an image sensor may be stored and/or output using the AP.

Figure 15:
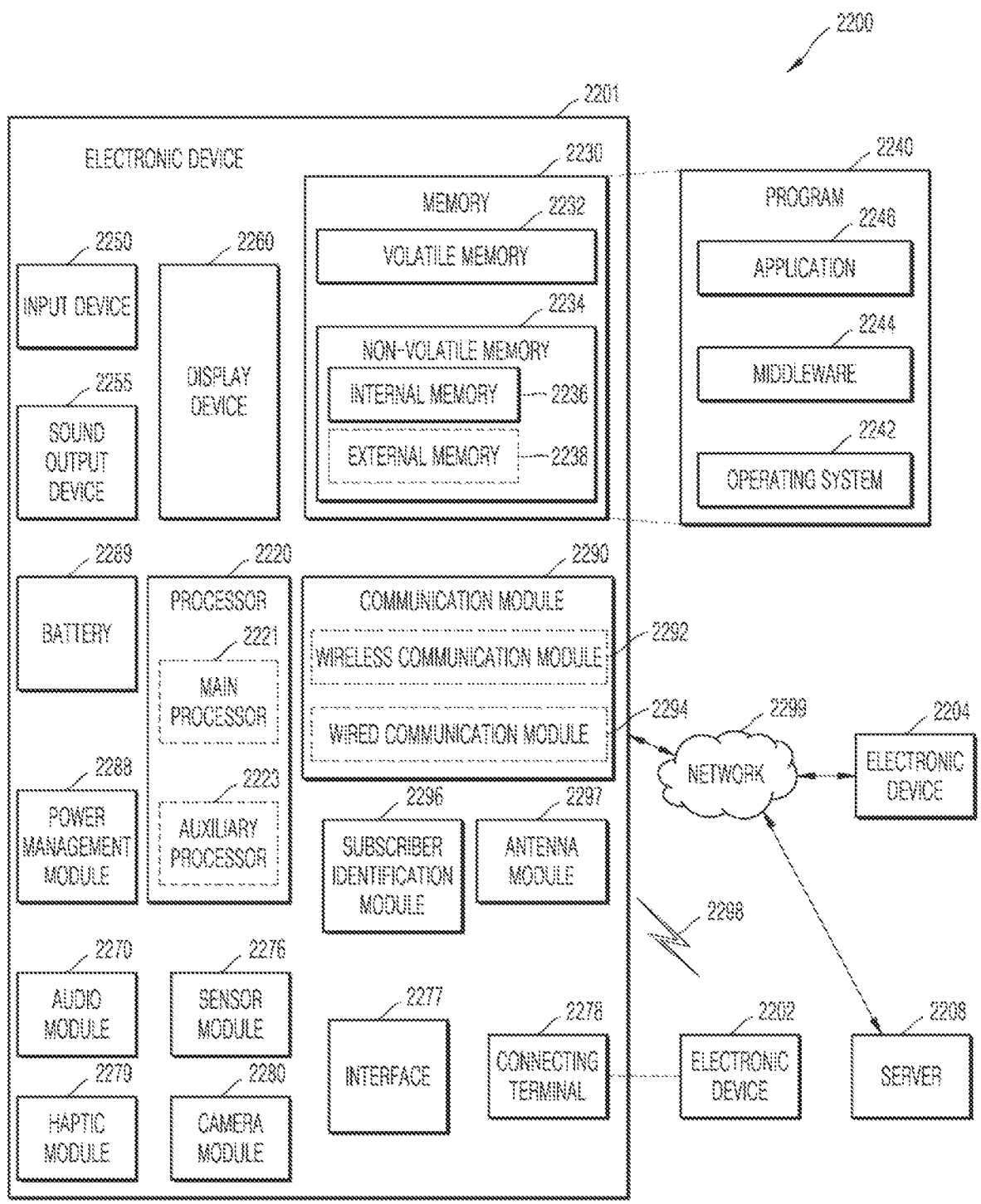
FIG. 15 is a block diagram of an electronic device in a network environment according to an embodiment.

FIG. 15 is a block diagram of an example of an electronic device 2201 in a network environment 2200 according to an embodiment of the disclosure. Referring to FIG. 15, the electronic device 2201 in the network environment 2200 may communicate with another electronic device 2202 via a first network 2298 (e.g., a short-range wireless communication network, etc.), or another electronic device 2204 or a server 2208 via a second network 2299 (e.g., a long-range wireless communication network, etc.). The electronic device 2201 may communicate with the electronic device 2204 via the server 2208. The electronic device 2201 may include a processor 2220, memory 2230, an input device 2250, a sound output device 2255, a display device 2260, an audio module 2270, a sensor module 2276, an interface 2277, a haptic module 2279, a camera module 2280, a power management module 2288, a battery 2289, a communication module 2290, a subscriber identification module 2296, and/or an antenna module 2297. Some (e.g., the display device 2260, etc.) of the components may be omitted from the electronic device 2201, or other components may be added to the electronic device 2201. Some of the components may be implemented as single integrated circuitry. For example, the sensor module 2276 (e.g., a fingerprint sensor, an iris sensor, or an illuminance sensor) may be implemented as embedded in the display device 2260 (e.g., a display, etc.).

The processor 2220 may execute software (e.g., a program 2240, etc.) to control one component or a plurality of different components (e.g., a hardware or software component, etc.) coupled with the processor 2220, and may perform various data processing or computation. As a part of the data processing or computation, the processor 2220 may load a command or data received from another component (e.g., the sensor module 2276, the communication module 2290, etc.) in volatile memory 2232, process the command and/or the data stored in the volatile memory 2232, and store resulting data in non-volatile memory 2234. The non-volatile memory 2234 may include an internal memory 2236 and an external memory 2238. The processor 2220 may include a main processor 2221 (e.g., a central processing unit, an AP, etc.), and an auxiliary processor 2223 (e.g., a graphics processing unit, an image signal processor, a sensor hub processor, a communication processor, etc.) that is operable independently from, or in conjunction with, the main processor 2221. The auxiliary processor 2223 may use less power than the main processor 2221 and perform a specialized function.

The auxiliary processor 2223 may control functions and/or states related to some components (e.g., the display device 2260, the sensor module 2276, the communication module 2290, etc.) among the components of the electronic device 2201, instead of the main processor 2221 while the main processor 2221 is in an inactive (e.g., sleep) state, or together with the main processor 2221 while the main processor 2221 is in an active (e.g., application execution) state. The auxiliary processor 2223 (e.g., an image signal processor, a communication processor, etc.) may be implemented as part of another component (e.g., the camera module 2280, the communication module 2290, etc.) functionally related thereto.

The memory 2230 may store various data needed by a component (e.g., the processor 2220, the sensor module 2276, etc.) of the electronic device 2201. The various data may include, for example, software (e.g., the program 2240, etc.) and input data and/or output data for a command related thereto. The memory 2230 may include the volatile memory 2232 and/or the non-volatile memory 2234.

The program 2240 may be stored in the memory 2230 as software, and may include, for example, an operating system 2242, middleware 2244, and/or an application 2246.

The input device 2250 may receive a command and/or data to be used by another component (e.g., the processor 2220, etc.) of the electronic device 2201, from the outside (e.g., a user, etc.) of the electronic device 2201. The input device 2250 may include a microphone, a mouse, a keyboard, and/or a digital pen (e.g., a stylus pen, etc.).

The sound output device 2255 may output sound signals to the outside of the electronic device 2201. The sound output device 2255 may include a speaker and/or a receiver. The speaker may be used for general purposes, such as playing multimedia or playing a recording, and the receiver may be used for an incoming calls. The receiver may be coupled as a part of the speaker or may be implemented as an independent separate device.

The display device 2260 may visually provide information to the outside of the electronic device 2201. The display device 2260 may include a display, a hologram device, or a projector and control circuitry to control a corresponding one of the display, hologram device, and projector. The display device 2260 may include touch circuitry adapted to detect a touch, and/or sensor circuitry (e.g., a pressure sensor, etc.) adapted to measure the intensity of force incurred by the touch.

The audio module 2270 may convert a sound into an electrical signal or vice versa. The audio module 2270 may obtain the sound via the input device 2250, or output the sound via the sound output device 2255 and/or a speaker and/or a headphone of another electronic device (e.g., the electronic device 2202, etc.) directly (e.g., wiredly) or wirelessly coupled with the electronic device 2201.

The sensor module 2276 may detect an operational state (e.g., power, temperature, etc.) of the electronic device 2201 or an environmental state (e.g., a state of a user, etc.) external to the electronic device 2201, and then generate an electrical signal and/or data value corresponding to the detected state. The sensor module 2276 may include a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, and/or an illuminance sensor.

The interface 2277 may support one or more specified protocols to be used for the electronic device 2201 to be coupled with another electronic device (e.g., the electronic device 2202, etc.) directly or wirelessly. The interface 2277 may include a high definition multimedia interface (HDMI), a universal serial bus (USB) interface, a secure digital (SD) card interface, and/or an audio interface.

A connecting terminal 2278 may include a connector via which the electronic device 2201 may be physically connected with another electronic device (e.g., the electronic device 2202, etc.). The connecting terminal 2278 may include, for example, an HDMI connector, a USB connector, an SD card connector, and/or an audio connector (e.g., a headphone connector, etc.).

The haptic module 2279 may convert an electrical signal into a mechanical stimulus (e.g., a vibration, motion, etc.) or electrical stimulus which may be recognized by a user via his tactile sensation or kinesthetic sensation. The haptic module 2279 may include a motor, a piezoelectric element, and/or an electric stimulator.

The camera module 2280 may capture a still image or moving images. The camera module 2280 may include a lens assembly including one or more lenses, image sensors, image signal processors, and/or flashes. The lens assembly included in the camera module 2280 may collect light emitted from an object that is an image capturing target, and may be any one of the lens assemblies 100 described above with reference to FIGS. 1, 7, 8, 9, and 10.

The power management module 2288 may manage power supplied to the electronic device 2201. The power management module 2288 may be implemented as a part of a power management integrated circuit (PMIC).

The battery 2289 may supply power to a component of the electronic device 2201. The battery 2289 may include a primary cell which is not rechargeable, a secondary cell which is rechargeable, and/or a fuel cell.

The communication module 2290 may support establishing a direct (e.g., wired) communication channel and/or a wireless communication channel between the electronic device 2201 and another electronic device (e.g., the electronic device 2202, the electronic device 2204, the server 2208, etc.) and performing communication via the established communication channel. The communication module 2290 may include one or more communication processors that are operable independently from the processor 2220 (e.g., the AP, etc.) and support direct communication and/or wireless communication. The communication module 2290 may include a wireless communication module 2292 (e.g., a cellular communication module, a short-range wireless communication module, a global navigation satellite system (GNSS) communication module, etc.) and/or a wired communication module 2294 (e.g., a local area network (LAN) communication module, a power line communication module, etc.). A corresponding one of these communication modules may communicate with the external electronic device via the first network 2298 (e.g., a short-range communication network, such as Bluetooth™, Wireless-Fidelity (Wi-Fi) direct, or infrared data association (IrDA)) or the second network 2299 (e.g., a long-range communication network, such as a cellular network, the Internet, or a computer network (e.g., a LAN, a wide area network (WAN), etc.). These various types of communication modules may be implemented as a single component (e.g., a single chip, etc.), or may be implemented as multi components (e.g., multi chips) separate from each other. The wireless communication module 2292 may identify and authenticate the electronic device 2201 in a communication network, such as the first network 2298 and/or the second network 2299, using subscriber information (e.g., international mobile subscriber identity (IMSI), etc.) stored in the subscriber identification module 2296.

The antenna module 2297 may transmit or receive a signal and/or power to or from the outside (e.g., another electronic device, etc.). The antenna may include a radiator including a conductive pattern formed on a substrate (e.g., a printed circuit board (PCB), etc.). The antenna module 2297 may include one antenna or a plurality of antennas. When the plurality of antennas are included, an antenna that is appropriate for a communication scheme used in a communication network such as the first network 2298 and/or the second network 2299 may be selected by the communication module 2290 from among the plurality of antennas. The signal and/or the power may then be transmitted or received between the communication module 2290 and another electronic device via the selected antenna. A part (e.g., a radio frequency integrated circuit (RFIC), etc. other than an antenna may be included as a part of the antenna module 2297.

Some of the above-described components may be coupled mutually and exchange signals (e.g., commands, data, etc.) therebetween via an inter-peripheral communication scheme (e.g., a bus, a general purpose input and output (GPIO), a serial peripheral interface (SPI), a mobile industry processor interface (MIPI), etc.).

Commands or data may be transmitted or received between the electronic device 2201 and the external electronic device 2204 via the server 2208 coupled with the second network 2299. The other electronic devices 2202 and 2204 may be a device of a same type as, or a different type, from the electronic device 2201. All or some of operations to be executed at the electronic device 2201 may be executed at one or more of the other electronic devices 2202, 2204, and 2208. For example, when the electronic device 2201 performs a function or a service, the electronic device 2201, instead of executing the function or the service, may request the one or more other electronic devices to perform the entire function or service or a part thereof. One or more other electronic devices receiving a request may perform an additional function or an additional service related to the request, and transfer an outcome of the performing to the electronic device 2201. To that end, a cloud computing, distributed computing, and/or client-server computing technology may be used, for example.

Figure 16:
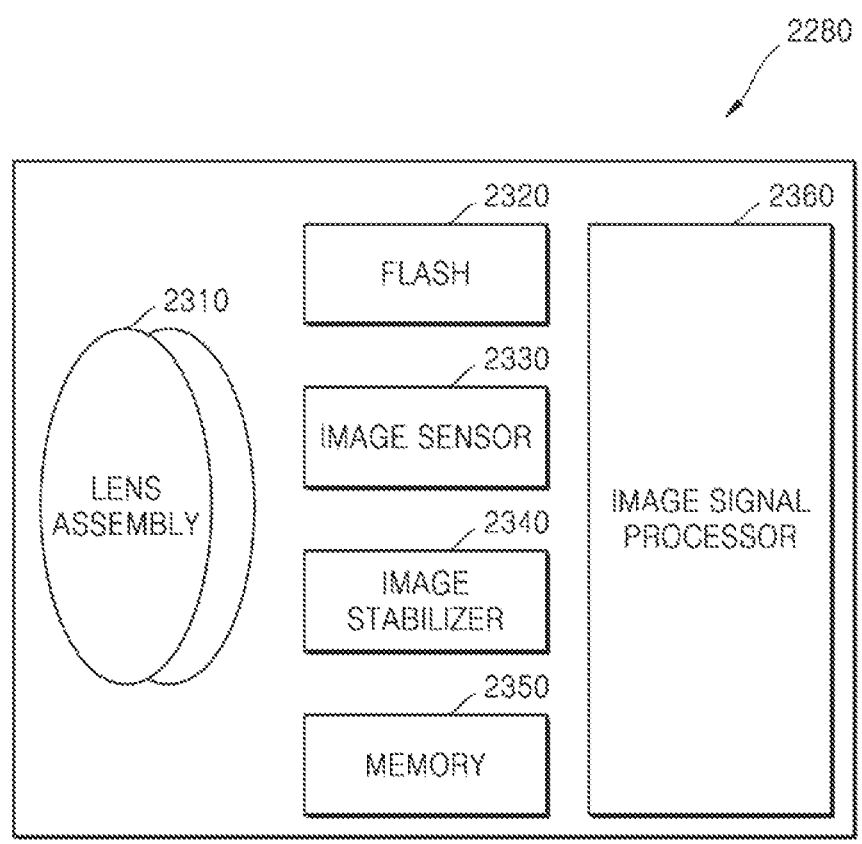
FIG. 16 is a block diagram showing a camera module of FIG. 15 in detail.

FIG. 16 is a block diagram showing the camera module 2280 of FIG. 15 in detail. Referring to FIG. 16, the camera module 2280 may include a lens assembly 2310, a flash 2320, an image sensor 2330 (e.g., the image sensor 150 of FIG. 1, etc.), an image stabilizer 2340, a memory 2350 (e.g., buffer memory, etc.), and/or an image signal processor 2360. The lens assembly 2310 may collect light emitted from an object that is an image capturing target, and may be any one of the lens assemblies described above with reference to FIGS. 1 through 14D. The camera module 2280 may include a plurality of lens assemblies 2310, and in this case, the camera module 2280 may be a dual camera, a 360-degree camera, or a spherical camera. Some of the plurality of lens assemblies 2310 may have the same lens attribute (e.g., a view angle, a focal length, auto-focusing, an F number, optical zoom, etc.), or other lens attributes. The lens assembly 2310 may include a wide-angle lens or a telephoto lens.

The flash 2320 may emit light that is used to reinforce light reflected from an object. The flash 2320 may include one or more light emitting diodes (LEDs) (e.g., a red-green-blue (RGB) LED, a white LED, an infrared (IR) LED, an ultraviolet (UV) LED, etc.), and/or a xenon lamp. The image sensor 2330 may be the image sensor 150 described with reference to FIGS. 1, 5, and 7, and may obtain an image corresponding to an object by converting light emitted or reflected from the object and transmitted via the lens assembly 2310 into an electrical signal. The image sensor 2330 may include one sensor or a plurality of sensors selected from image sensors having different attributes, such as an RGB sensor, a black-and-white (BW) sensor, an IR sensor, or a UV sensor. Each sensor included in the image sensor 2330 may be implemented, for example, with a charged coupled device (CCD) sensor and/or a complementary metal oxide semiconductor (CMOS) sensor.

The image stabilizer 2340 may move the image sensor 2330 or one lens or a plurality of lenses included in the lens assembly 2310 in a particular direction or control an operational attribute (e.g., adjust the read-out timing) of the image sensor 2330, in response to the movement of the camera module 2280 or the electronic device 2201 including the camera module 2280, thereby compensating for the negative effects of the movement. The image stabilizer 2340 may sense the movement of the camera module 2280 or the electronic device 2201 using a gyro sensor or an acceleration sensor disposed inside or outside the camera module 2280. The image stabilizer 2340 may be implemented optically.

The memory 2350 may store the entire data of an image obtained via the image sensor 2330, or a part of the data, for a subsequent image processing task. For example, when the plurality of images are obtained fast, the obtained original data (e.g., Bayer-patterned data, high-resolution data, etc.) may be stored in the memory 2350 and a low-resolution image may be displayed for use in transmission of the original data of the selected image (e.g., a user-selected image, etc.) to the image signal processor 2360. The memory 2350 may be integrated into the memory 2230 of the electronic device 2201 or may be configured as a separate memory managed independently.

The image signal processor 2360 may perform one or more image processing with respect to an image obtained via the image sensor 2330 or image data stored in the memory 2350. The one or more image processing may include depth map generation, three-dimensional (3D) modeling, panorama generation, feature point extraction, image synthesizing, and/or image compensation (e.g., noise reduction, resolution adjustment, brightness adjustment, blurring, sharpening, softening, etc.). The image signal processor 2360 may perform control (e.g., exposure time control, read-out timing control, etc.) with respect to the components (e.g., the image sensor 2330) included in the camera module 2280. An image processed by the image signal processor 2360 may be stored back in the memory 2350 for further processing, or may be provided to an external component (e.g., the memory 2230, the display device 2260, the electronic device 2202, the electronic device 2204, the server 2208, etc.) outside the camera module 2280. The image signal processor 2360 may be integrated into the processor 2220, or may be configured as a separate processor that is managed independently from the processor 2220. When the image signal processor 2360 is configured as a separate processor from the processor 2220, an image processed by the image signal processor 2360 may be displayed, by the processor 2220, on the display device 2260 after being further image-processed.

The electronic device 2201 may include a plurality of camera modules 2280 having different attributes or functions. In such a case, one of the plurality of camera modules 2280 may be a wide-angle camera and another one of the plurality of camera modules 2280 may be a telephoto camera. Similarly, one of the plurality of camera modules 2280 may be a front camera and another one of the plurality of camera modules 2280 may be a rear camera.

Figure 17:
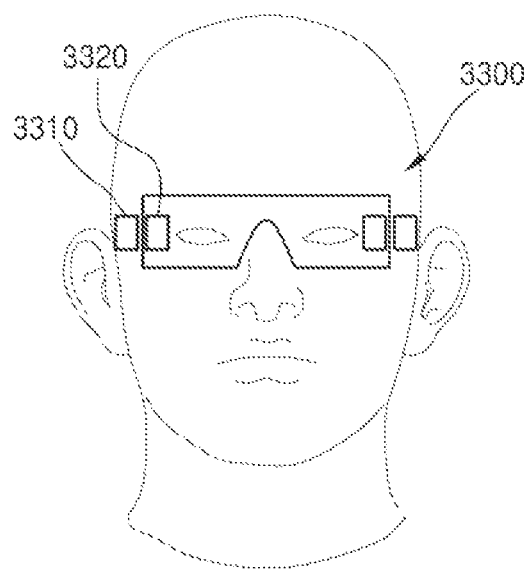
FIGS. 17 through 23 show examples of electronic devices to which a meta lens assembly according to embodiments is applied.

FIG. 17 shows an example where a meta lens assembly according to an embodiment of the disclosure is applied to AR glasses or VR glasses. AR glasses 3300 may include a projection system 3310 that forms an image and an element 3320 that guides the image from the projection system 3310 to the user's eyes. The projection system 3310 may include the meta lens assembly described with reference to FIGS. 1 through 14D.

Figure 18:
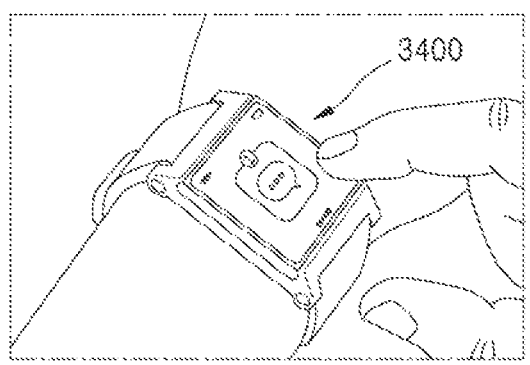

FIG. 18 shows an example in which a metal lens assembly according to an embodiment of the disclosure is applied to a wearable display. A wearable display 3400 may include the meta lens assembly described with reference to FIGS. 1 through 14D and may be implemented through the electronic device described with reference to FIGS. 15 and 16.

Figure 19:
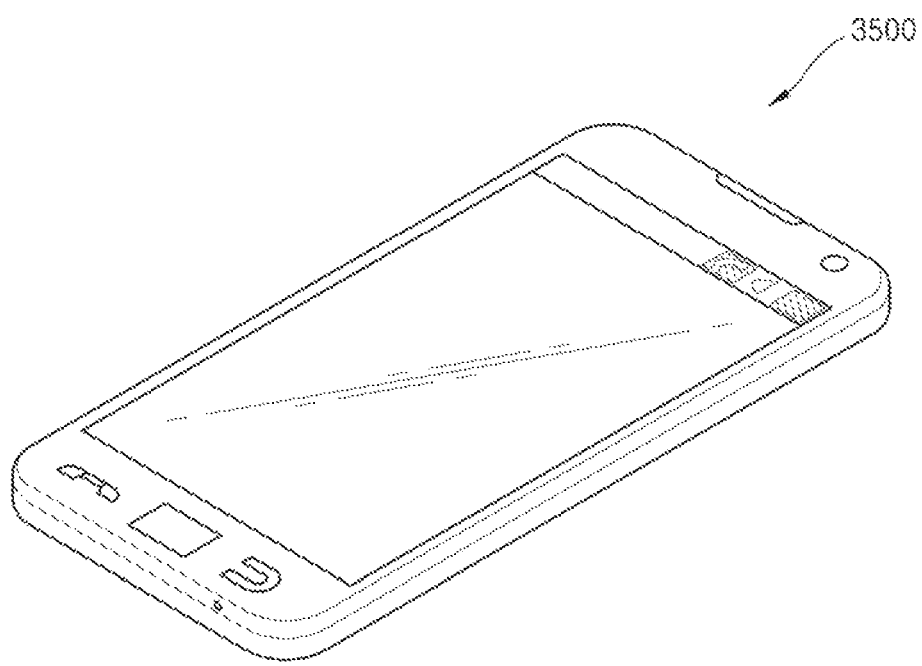
Figure 20:
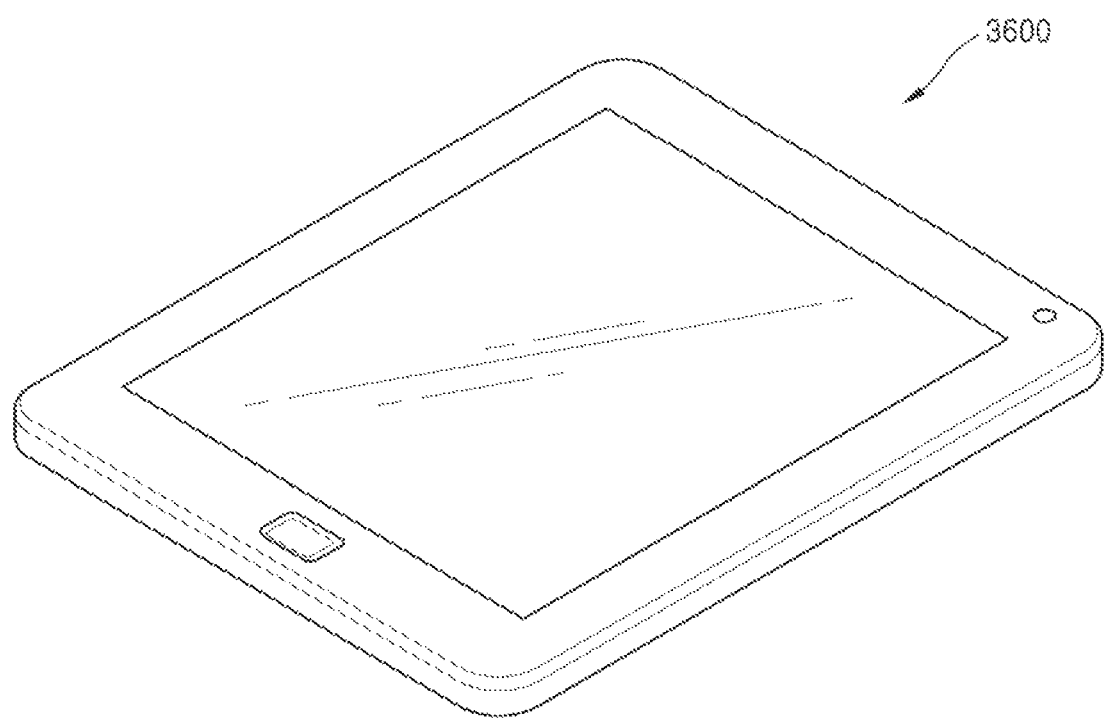
Figure 21:
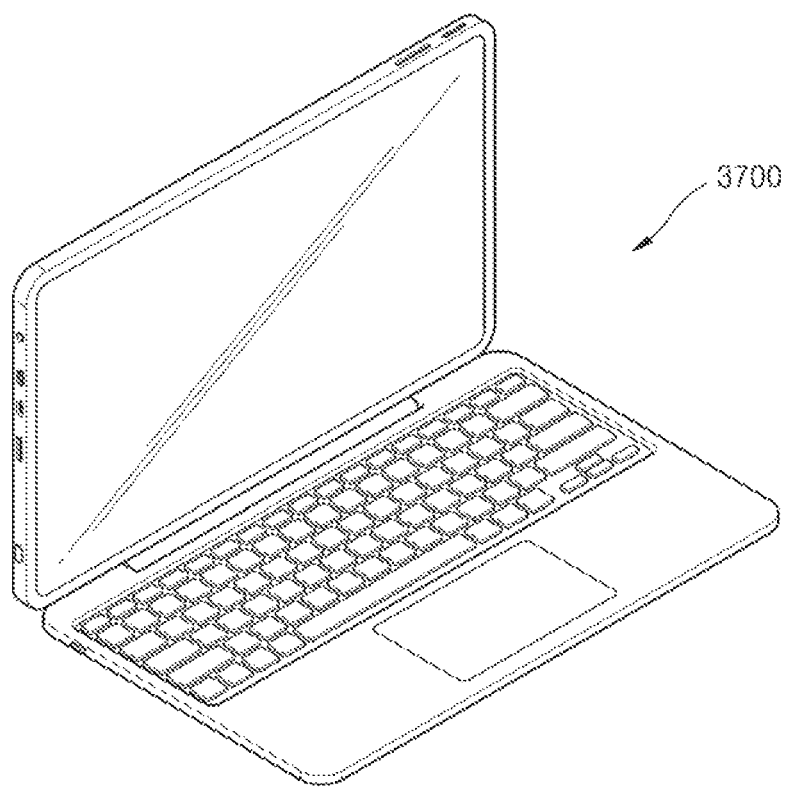
Figure 22:
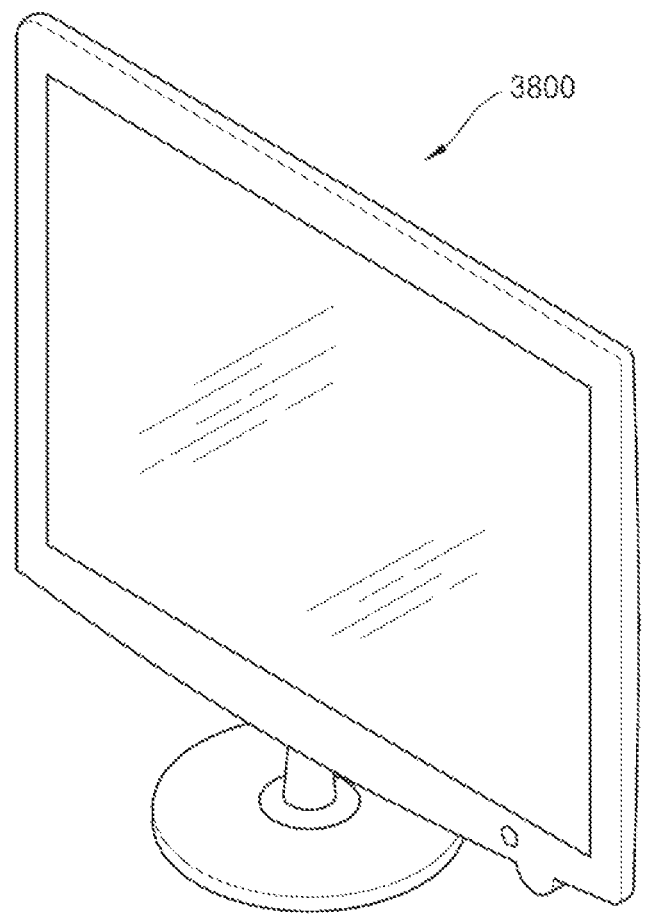
Figure 23:
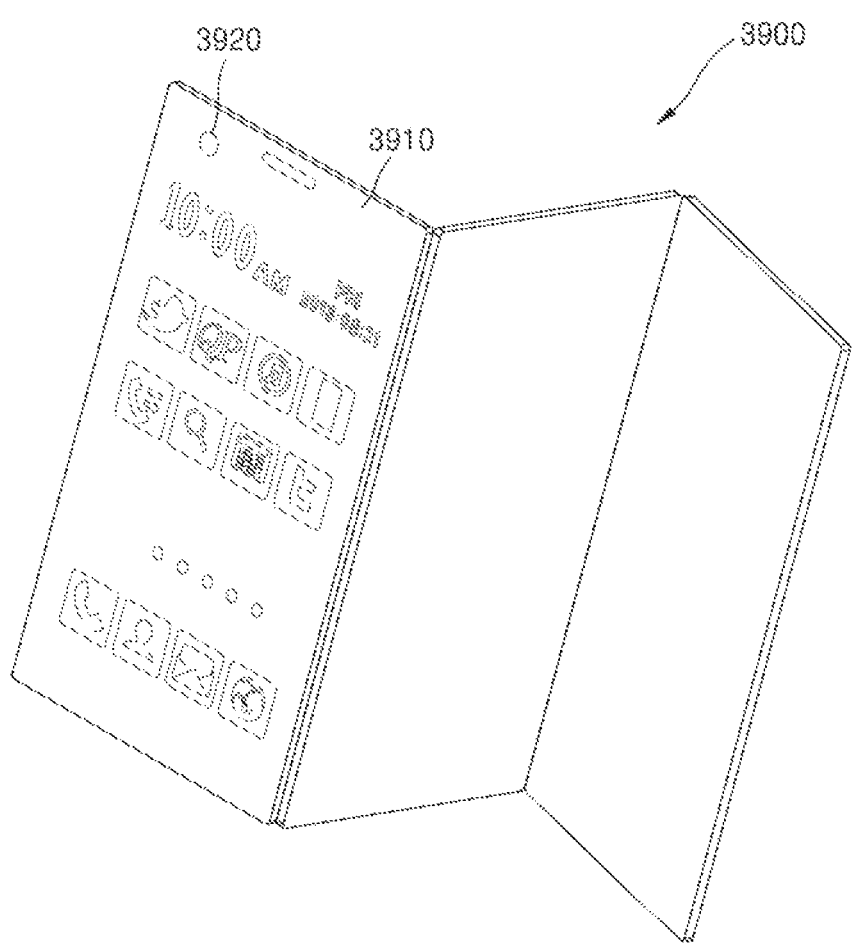

FIG. 19 shows an example in which a metal lens assembly according to an embodiment of the disclosure is applied to a mobile phone or a smartphone. A smartphone 3500 may include a camera that may include the meta lens assembly according to an embodiment of the disclosure. The electronic device according to embodiments of the disclosure may be applied to a tablet or smart tablet 3600 shown in FIG. 20, a laptop computer 3700 shown in FIG. 21, or a television (TV) or smart TV 3800 shown in FIG. 22. For example, the smartphone 3500 or the smart tablet 3600 may include a high-resolution camera. By using high-resolution cameras, depth information of objects in an image may be extracted, out-focusing of the image may be adjusted, or the objects in the image may be automatically identified. The electronic device according to an embodiment of the disclosure may include a foldable structure, e.g., a multi-foldable structure 3900 that may include a camera 3920 and a display device 3910. The meta lens assembly according to various embodiments of the disclosure may be applied to a folded camera of a mobile phone or smartphone. The meta lens assembly may also be applied to various products such as a smart refrigerator, a security camera, a robot, a medical camera, etc.

The meta lens assembly according to an embodiment of the disclosure may control a phase of incident light through appropriate arrangement of nano structures having different sizes, and the meta lens may operate as a lens having a positive refractive power or a lens having a negative refractive power. The function of the refractive lens may be designed two-dimensionally, and various imaging systems may be proposed using a single layer of the meta lenses or a combination of a plurality of layers of the meta lenses.

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A meta lens assembly comprising:
a first meta lens;
a second meta lens arranged on an image side of the first meta lens; and
a third meta lens arranged on an image side of the second meta lens,
wherein the first meta lens, the second meta lens, and the third meta lens are arranged from an object side of the meta lens assembly to an image side of the meta lens assembly facing an image sensor,
wherein a phase profile of the second meta lens has an inflection point which is between a midpoint of a radius of the second meta lens and an edge of the second meta lens such that light emitted from the second meta lens is phase shifted, and
wherein a phase profile of the third meta lens has an inflection point which is between a midpoint of a radius of the third meta lens and an edge of the third meta lens such that light emitted from the third meta lens is phase shifted,
wherein a distance between the inflection point of the third meta lens and a center of the third meta lens is larger than a distance between the inflection point of the second meta lens and a center of the second meta lens.

2. The meta lens assembly of claim 1,
wherein the phase profile of the second meta lens changes from concave to convex.

3. The meta lens assembly of claim 1,
wherein the phase profile of the third meta lens changes from convex to concave.

4. The meta lens assembly of claim 1, further comprising an iris in a marginal portion of the first meta lens,
wherein the iris comprises a material that absorbs or reflects light, and
wherein the iris defines a region in which the light passes through the first meta lens.

5. The meta lens assembly of claim 1,
wherein the first meta lens has a first positive refractive power, the second meta lens has a negative refractive power, and the third meta lens has a second positive refractive power.

6. The meta lens assembly of claim 1,
wherein a first diameter of the first meta lens is less than a third diameter of the third meta lens and a second diameter of the second meta lens is less than the third diameter of the third meta lens.

7. The meta lens assembly of claim 1,
wherein an interval between the first meta lens and the second meta lens is in a range of about 10 μm through about 100 μm.

8. The meta lens assembly of claim 1,
wherein a distance from the first meta lens to the image sensor is less than or equal to about 1.7 mm.

9. The meta lens assembly of claim 1, further comprising cover glass on an object side of the first meta lens.

10. The meta lens assembly of claim 1,
wherein the meta lens assembly has an angle of view of about 40 degrees to about 80 degrees.

11. The meta lens assembly of claim 1, further comprising cover glass between the third meta lens and the image sensor.

12. The meta lens assembly of claim 1,
wherein each of the first meta lens, the second meta lens, and the third meta lens comprises a plurality of nano structures.

13. The meta lens assembly of claim 1,
wherein the second meta lens comprises a first region comprising first nano structures and a second region comprising second nano structures,
wherein the first nano structures in the first region are arranged to gradually increase in size in a radial direction of the second meta lens, and
wherein the second nano structures in the second region are arranged to gradually decrease in size in the radial direction of the second meta lens.

14. The meta lens assembly of claim 1,
wherein the third meta lens comprises a third region comprising third nano structures and a fourth region comprising fourth nano structures,
wherein the third nano structures in the third region are arranged to gradually decrease in size in a radial direction of the third meta lens, and
wherein the fourth nano structures in the fourth region are arranged to gradually increase in size in the radial direction of the third meta lens.

15. An augmented reality glasses comprising:
an eye tracking camera configured to track eyes of user based on a plurality of meta lenses; and
a projection system configured to display an image according to the tracked user's eyes,
wherein the plurality of meta lenses comprises:
a first meta lens;
a second meta lens arranged on an image side of the first meta lens; and
a third meta lens arranged on an image side of the second meta lens,
wherein the first meta lens, the second meta lens, and the third meta lens are arranged from the object side of the plurality of meta lenses to the image side of the plurality of meta lenses facing an image sensor,
wherein a phase profile of the second meta lens has an inflection point which is between a midpoint of a radius of the second meta lens and an edge of the second meta lens such that light emitted from the second meta lens is phase shifted, and
wherein a phase profile of the third meta lens has an inflection point which is between a midpoint of a radius of the third meta lens and an edge of the third meta lens such that light emitted from the third meta lens is phase shifted,
wherein a distance between the inflection point of the third meta lens and a center of the third meta lens is larger than a distance between the inflection point of the second meta lens and a center of the second meta lens.

16. The augmented reality glasses of claim 15,
wherein the phase profile of the second meta lens changes from concave to convex.

17. The augmented reality glasses of claim 15,
wherein the phase profile of the third meta lens changes from convex to concave.

* * * * *